United States Patent
Kenmoku et al.

(10) Patent No.: US 7,465,779 B2
(45) Date of Patent: Dec. 16, 2008

(54) POLYHYDROXYALKANOATE HAVING VINYL GROUP, ESTER GROUP, CARBOXYL GROUP AND SULFONIC ACID GROUP, AND PRODUCTION METHOD THEREOF

(75) Inventors: Takashi Kenmoku, Fujisawa (JP); Tatsuki Fukui, Yokohama (JP); Chieko Mihara, Isehara (JP); Ako Kusakari, Atsugi (JP); Tetsuya Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 400 days.

(21) Appl. No.: 10/567,762

(22) PCT Filed: Jun. 9, 2005

(86) PCT No.: PCT/JP2005/010998

§ 371 (c)(1),
(2), (4) Date: Feb. 10, 2006

(87) PCT Pub. No.: WO2005/121206

PCT Pub. Date: Dec. 22, 2005

(65) Prior Publication Data

US 2006/0247414 A1    Nov. 2, 2006

(30) Foreign Application Priority Data

Jun. 11, 2004    (JP) ............................. 2004-174784

(51) Int. Cl.
*C08G 63/02* (2006.01)
(52) U.S. Cl. ...................... 528/290; 528/271; 528/272; 528/288; 528/293
(58) Field of Classification Search ................. 528/272, 528/271, 288, 290, 293
See application file for complete search history.

(56) References Cited

U.S. PATENT DOCUMENTS

| | | | |
|---|---|---|---|
| 4,265,247 A | 5/1981 | Lenz et al. | |
| 6,521,429 B2 | 2/2003 | Honma et al. | |
| 6,645,743 B1 | 11/2003 | Honma et al. | |
| 6,908,721 B2 * | 6/2005 | Kenmoku et al. | ........ 430/108.5 |
| 2003/0100700 A1 * | 5/2003 | Imamura et al. | ............ 528/272 |
| 2004/0081906 A1 | 4/2004 | Kenmoku et al. | ........ 430/108.4 |
| 2005/0260514 A1 | 11/2005 | Mihara et al. | ............ 430/108.4 |
| 2006/0014921 A1 * | 1/2006 | Mihara et al. | ................ 528/272 |
| 2007/0073006 A1 | 3/2007 | Kenmoku et al. | |

FOREIGN PATENT DOCUMENTS

| | | | |
|---|---|---|---|
| EP | 1 336 635 A1 | 8/2003 | |
| JP | 59-190945 A | 10/1984 | |
| JP | 2-3415 A | 1/1990 | |
| WO | WO 2004/038512 A1 | 5/2004 | |
| WO | WO 2004/044213 A1 | 5/2004 | |
| WO | WO 2004/061530 A1 | 7/2004 | |
| WO | 2005/121204 A2 | 12/2005 | |
| WO | 2005/121205 A2 | 12/2005 | |
| WO | 2005/121208 A1 | 12/2005 | |

OTHER PUBLICATIONS

Mikael Trollsås et al., "Hydrophillic Aliphatic Polyesters: Design, Synthesis, and Ring-Opening Polymerization of Functional Cyclic Esters," 33 Macromol. 4619-27 (2000).
S. Ponsart et al., "A Novel Route to Poly(ε-caprolactone)-Based Copolymers via Anionic Derivatization," 1 Biomolecules 275-81 (2000).
Benjamin Saulnier et al., "Lactic Acid-Based Functionalized Polymers via Copolymerization and Chemical Modification," 4 Macromol. Biosci. 232-37 (2004).
Bryan Parrish et al., "Functional Polyesters by Ring-Opening Polymerization of α-allyl(δ-valerolactone)," 87 Polymer. Mater.: Sci. & Eng. 254-55 (2002).
C.P. Radano et al., "Synthesis of Novel Biodegradable Copolyesters Using Olefin Metathesis," 43(2) Polymer Reprints 727-28 (2002).
Tetsuji Yamaoka et al., "Synthesis and Properties of Malic Acid-Containing Functional Polymers," 25 Intl. J. Biol. Macromol. 265-71 (1999).
Lindsay H. Briggs et al., "Degradation of the Lanosterol Side-Chain," J.C.S. Perkin I, 806-09 (1973).
Organic Synthesis, vol. 4, pp. 698-699 (1963).
Harry R. Allcock et al., "Reactions of Steroid Salts with Hexachlorocyclotriphosphazene," 46 J. Org. Chem. 13-22 (1981).
J.K. Stille et al., "Tetracyclic Dienes. I. The Diels-Alder Adduct of Norbornadiene and Cyclopentadiene," 81 J. Am. Chem. Soc. 4273-75 (Aug. 1959).
Marie-Maud Bear et al., "Preparation of a Bacterial Polyester with Carboxy Groups in Side Chains," 4 Chemistry 289-93 (2001).
Dirk Brohm et al., "Solid-Phase Synthesis of Dysidiolode-Derived Protein Phosphatase Inhibitors," 124 J. Am. Chem. Soc. 13171-78 (2002).
Jon D. Stewart et al., "Recombinant Baker's Yeast as a Whole-Cell Catalyst for Asymmetric Baeyer-Villiger Oxidations," 120(15) J. Am. Chem. Soc. 3541-48 (Apr. 1998).

* cited by examiner

*Primary Examiner*—Irina S Zemel
*Assistant Examiner*—Frances Tischler
(74) *Attorney, Agent, or Firm*—Fitzpatrick, Cella, Harper & Scinto

(57) ABSTRACT

A novel polyhydroxyalkanoate having a reactive functional group in a molecule, and a production method thereof, etc. are provided. By utilizing the vinyl group of polyhydroxyalkanoate which contains a unit having a vinyl group on a side chain, a polyhydroxyalkanoate which contains a carboxyl group and a unit having an amide group and a sulfonic acid group in a molecule is derived.

4 Claims, No Drawings

POLYHYDROXYALKANOATE HAVING VINYL GROUP, ESTER GROUP, CARBOXYL GROUP AND SULFONIC ACID GROUP, AND PRODUCTION METHOD THEREOF

TECHNICAL FIELD

The present invention relates to a novel polyhydroxyalkanoate and a production method thereof.

BACKGROUND ART

Biodegradable polymer materials are widely applied to medical materials, drug delivery systems, environmentally compatible materials, etc. In recent years, new functions besides these are further demanded and various researches have been conducted. Particularly, introducing a chemically modifiable functional group into a molecule of polyhydroxyalkanoate represented by polylactic acid is examined, and there are some reports about a compound to which a carboxyl group, a vinyl group or the like is introduced. For example, polymalic acid is known as a polyhydroxyalkanoate having a carboxyl group in the side chain. Among the polymers of this polymalic acid, there have been known α-type compounds represented by the chemical formula (14):

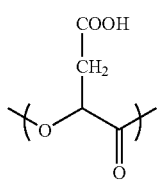

(14)

and β-type compounds represented by the chemical formula (15):

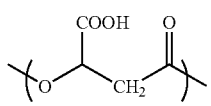

(15)

which are different in the way of polymer formation. Among these, as for the β-type polymalic acid and its copolymer, a polymer obtained by ring-opening polymerization of benzyl ester of β-malolactone represented by the chemical formula (16):

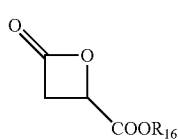

(16)

($R_{16}$: benzyl group) is disclosed in the specification of U.S. Pat. No. 4,265,247. In addition, as for the α-type polymalic acid-glycolic acid copolymer and other copolymers containing hydroxyalkanoic acid including glycolic acid, polymers obtained by copolymerizing a 6-membered cyclic diester monomer represented by the chemical formula (17):

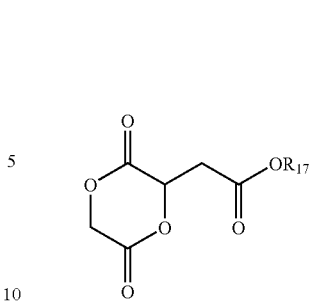

(17)

wherein $R_{17}$ represents a lower alkyl group such as a methyl group, an ethyl group, n-propyl group, an isopropyl group, and a t-butyl group and a benzyl group, etc., and a glycolide and lactide which are cyclic diesters, a lactone which is an ester by intramolecular ring closure reaction of ω-hydroxycarboxylic acid are disclosed in Japanese Patent Application Laid-Open No. H2-3415.

In addition, with regard to a polyhydroxyalkanoate having a carboxyl group on a side chain, it is disclosed in Macromolecules 2000, 33 (13), 4619-4627 that ring-opening polymerization of 7-oxo-4-oxepane carboxylate ester is conducted to prepare a polymer having an ester group on a side chain, which is further subjected to hydrocracking to prepare a polymer having carboxylic acid on a side chain. Biomacromolecules 2000, 1, 275 discloses a polymer to which benzyloxycarbonyl group is introduced at the α-position methylene group of a carbonyl group in the poly(ε-caprolactone) main chain by reacting poly(ε-caprolactone) with lithium diisopropylamide and further reacting with benzyl chloroformate. Macromolecular Bioscience 2004, 4, 232 discloses a polymer to which (benzyloxycarbonyl)methyl group is introduced at the α-position methylene group of a carbonyl group in the polylactic acid main chain by reacting polylactic acid with lithium diisopropyl amide and further reacting with benzyl bromoacetate.

With regard to a polyhydroxyalkanoate having a vinyl group on a side chain, Polymeric Materials Science & Engineering 2002, 87, 254 discloses a polymer obtained by ring-opening polymerization of α-allyl (δ-valerolactone). With regard to a polyhydroxyalkanoate having a vinyl group on a side chain, Polymer Preprints 2002, 43 (2), 727 also discloses a polymer obtained by ring-opening polymerization of 3,6-diallyl-1,4-dioxane-2,5-dione which is a 6-membered ring diester monomer.

As mentioned above, there have been reported polymers having new functions imparted by further introducing a functionality providing structure to a polyhydroxyalkanoate to which a chemically modifiable functional group has been introduced. In International Journal of Biological Macromolecules 25 (1999) 265, ring-opening polymerization of a cyclic dimer of α-malic acid and glycolic acid gives a copolymer of α-type malic acid and glycolic acid, and a polyester having a carboxyl group on a side chain is obtained by deprotecting the obtained polymer. It is described that carboxyl group of a side chain of this compound was subjected to chemical modification with a tripeptide, the obtained polymer was evaluated about cellular adhesiveness and good results were obtained.

DISCLOSURE OF THE INVENTION

Although it is supposed to be possible to impart a new functionality by introducing a unit having a carboxyl group or a unit having a vinyl group which are reactive functional groups into a molecule and carrying out chemical modification of the reactive functional group as mentioned above, there have been few reports. Accordingly, the present invention provides a new polyhydroxyalkanoate having a reactive functional group in a molecule and a new polyhydroxyalkanoate having a new function imparted by performing chemical modification of the polyhydroxyalkanoate having a reactive functional group and a production method thereof.

Therefore, the present inventors have conducted intensive studies aiming at developing a new polyhydroxyalkanoate having a reactive functional group in a molecule and a new polyhydroxyalkanoate having a new function imparted by performing chemical modification of the polyhydroxyalkanoate having a reactive functional group and consequently achieved the invention shown below.

Polyhydroxyalkanoates according to the present invention include the following.

(1) A polyhydroxyalkanoate comprising one or more units represented by the chemical formula (1) in a molecule:

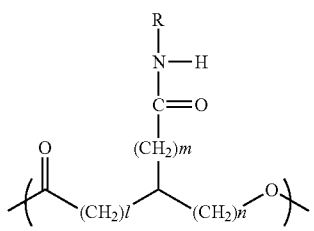

(1)

wherein R represents $-A_1-SO_2R_1$; $R_1$ is selected from the group consisting of OH, a halogen atom, ONa, OK and $OR_{1a}$; $R_{1a}$ and $A_1$ independently represent a group having a substituted or unsubstituted aliphatic hydrocarbon structure, a substituted or unsubstituted aromatic ring structure or a substituted or unsubstituted heterocyclic structure, respectively; l is an integer selected from 1 to 4, n is an integer selected from 1 to 4, and m is an integer selected from 0 to 8; and when two or more units are present, R, $R_1$, $R_{1a}$, $A_1$, and l, m and n mean as above independently for every unit.

(2) A polyhydroxyalkanoate comprising one or more units represented by the chemical formula (5) in a molecule:

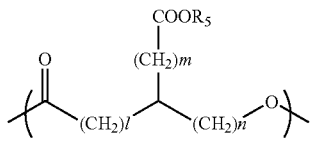

(5)

wherein $R_5$ is hydrogen, a salt forming group or $R_{5a}$; $R_{5a}$ is a linear or branched alkyl group having 1 to 12 carbon atoms, an aralkyl group or a substituent having a saccharide; l is an integer selected from 1 to 4, n is an integer selected from 1 to 4, m is an integer selected from 0 to 8; and when l is 1, 3 and 4, n is an integer selected from 1 to 4, and m is an integer selected from 0 to 8; and when l is 2 and n is 1, 3 and 4, m is an integer selected from 0 to 8; and when l is 2 and n is 2, m is an integer selected from 1 to 8; and when l is 2, n is 2 and m is 0, $R_{5a}$ is a substituting group having a saccharide; and when two or more units are present, $R_5$, $R_{5a}$, and l, m and n mean as above independently for every unit.

(3) A polyhydroxyalkanoate comprising one or more units represented by the chemical formula (6) in a molecule:

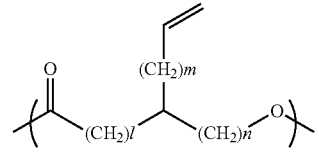

(6)

wherein l is an integer selected from 1 to 4, n is an integer selected from 1 to 4, and m is an integer selected from 0 to 8; and when two or more units are present, l, m, and n mean as above independently for every unit.

On the other hand, the production method of polyhydroxyalkanoate according to the present invention includes the following.

(A) A production method of polyhydroxyalkanoate represented by the chemical formula (6) having a step of polymerizing a compound having a unit represented by the chemical formula (8) in the presence of a catalyst.

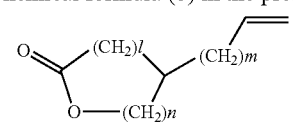

(8)

wherein l is an integer selected from 1 to 4, n is an integer selected from 1 to 4, and m is an integer selected from 0 to 8.

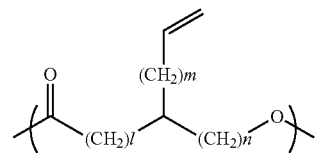

(6)

wherein l is an integer selected from 1 to 4, n is an integer selected from 1 to 4, and m is an integer selected from 0 to 8; and when two or more units are present, l, m and n mean as above independently for every unit.

(B) A production method of polyhydroxyalkanoate represented by the chemical formula (10) having a step of polymerizing a compound represented by the chemical formula (9) in the presence of a catalyst.

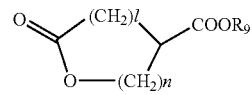

(9)

wherein $R_9$ is a substituent selected from a linear or branched alkyl group having 1 to 12 carbon atoms or an aralkyl group; l is an integer selected from 1 to 4, n is an integer selected from 1 to 4, and when l is 1, 3 or 4, n is an integer selected from 1 to 4, and when l is 2, n is 1, 3 or 4.)

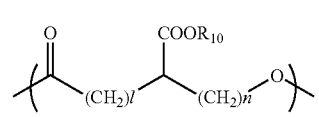

(10)

wherein $R_{10}$ is a substituent selected from a linear or branched alkyl group having 1 to 12 carbon atoms or an aralkyl group; l is an integer selected from 1 to 4, n is an integer selected from 1 to 4, and when l is 1, 3 or 4, n is an integer selected from 1 to 4, and when l is 2, n is 1, 3 or 4; and when two or more units are present, l, n and $R_{10}$ mean as above independently for every unit.

(C) A production method of polyhydroxyalkanoate containing a unit represented by the chemical formula (11) having a step of oxidizing a double bond portion of polyhydroxyalkanoate containing a unit represented by the chemical formula (6):

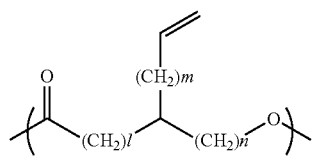
(6)

wherein l is an integer selected from 1 to 4, n is an integer selected from 1 to 4, and m is an integer selected from 0 to 8; and when two or more units are present, l, m and n mean as above independently for every unit.

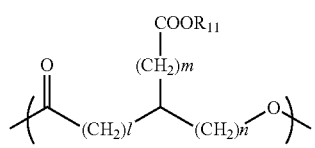
(11)

wherein $R_{11}$ is hydrogen or a salt forming group; l is an integer selected from 1 to 4, n is an integer selected from 1 to 4, and m is an integer selected from 0 to 8; and when two or more units are present, l, m, n and $R_{11}$ mean as above independently for every unit.

(D) A production method of polyhydroxyalkanoate containing a unit represented by the chemical formula (12) having a step of hydrolyzing a polyhydroxyalkanoate containing a unit represented by the chemical formula (10) in the presence of acid or alkali, or subjecting a polyhydroxyalkanoate containing a unit represented by the chemical formula (10) to hydrocracking including catalytic reduction:

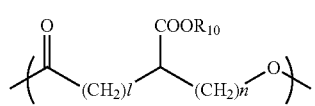
(10)

wherein $R_{10}$ is a substituent selected from a linear or branched alkyl group having 1 to 12 carbon atoms or an aralkyl group; l is an integer selected from 1 to 4, n is an integer selected from 1 to 4, and when l is 1, 3 or 4, n is an integer selected from 1 to 4, and when l is 2, n is 1, 3 or 4; and when two or more units are present, l n and $R_{10}$ mean as above independently for every unit.

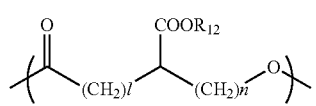
(12)

wherein $R_{12}$ is hydrogen or a salt forming group; l is an integer selected from 1 to 4, and when l is 1, 3, and 4, n is an integer selected from 1 to 4, and when l is 2, n is 1, 3, and 4; and when two or more units are present, l n and $R_{12}$ mean as above independently for every unit.

(E) A production method of polyhydroxyalkanoate containing a unit represented by the chemical formula (1) having a step of subjecting a polyhydroxyalkanoate containing a unit represented by the chemical formula (11) and at least one amine compound represented by the chemical formula (13) to condensation reaction:

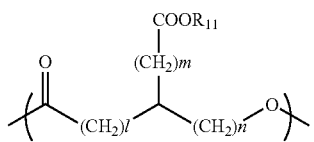
(11)

wherein $R_{11}$ is hydrogen or a salt forming group; l is an integer selected from 1 to 4, n is an integer selected from 1 to 4, and m is an integer selected from 0 to 8; and when two or more units are present, l, m, n and $R_{11}$ mean as above independently for every unit.

$$H_2N-A_3-SO_2R_{13} \quad (13)$$

wherein $R_{13}$ is selected from the group consisting of OH, a halogen atom, ONa, OK and $OR_{13a}$; $R_{13a}$ and $A_3$ are independently selected from a group having a substituted or unsubstituted aliphatic hydrocarbon structure, a substituted or unsubstituted aromatic ring structure or a substituted or unsubstituted heterocyclic structure, respectively; and when two or more units are present, $R_{13}$, $R_{13a}$ and $A_3$ mean as above independently for every unit.

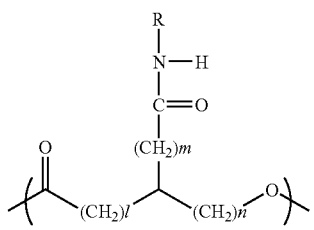
(1)

wherein R represents $-A_1-SO_2R_1$; $R_1$ is selected from the group consisting of OH, a halogen atom, ONa, OK and $OR_{1a}$; $R_{1a}$ and $A_1$ independently represent a group having a substituted or unsubstituted aliphatic hydrocarbon structure, a substituted or unsubstituted aromatic ring structure or a substituted or unsubstituted heterocyclic structure, respectively; l is an integer selected from 1 to 4, n is an integer selected from 1 to 4, and m is an integer selected from 0 to 8; and when two or more units are present, R, $R_1$, $R_{1a}$, $A_1$, l, m and n mean as above independently for every unit.

BEST MODE FOR CARRYING OUT THE INVENTION

Hereinbelow, the present invention is described in more detail referring to preferable embodiments. The target polyhydroxyalkanoate represented by the chemical formula (1) in the present invention can be prepared by reacting polyhydroxyalkanoate containing a unit represented by the chemical formula (11) used as a starting material and at least one aminosulfonic acid compound represented by the chemical formula (13).

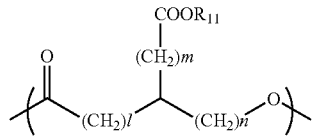

(11)

wherein $R_{11}$ is hydrogen or a salt forming group; l is an integer selected from 1 to 4, n is an integer selected from 1 to 4, and m is an integer selected from 0 to 8; and when two or more units are present, l, m, n and $R_{11}$ mean as above independently for every unit.

$$H_2N-A_3-SO_2R_{13} \qquad (13)$$

wherein $R_{13}$ is selected from the group consisting of OH, a halogen atom, ONa, OK and $OR_{13a}$; $R_{13a}$ and $A_3$ are independently selected from a group having a substituted or unsubstituted aliphatic hydrocarbon structure, a substituted or unsubstituted aromatic ring structure or a substituted or unsubstituted heterocyclic structure, respectively (here, $R_{13a}$ is a monovalent group having a structure selected from these and $A_3$ is a divalent group having a structure selected from these); and when two or more units are present, $R_{13}$, $R_{13a}$ and $A_3$ mean as above independently for every unit.

More in detail, $R_{13}$ is selected from the group consisting of OH, a halogen atom, ONa, OK and $OR_{13a}$. $R_{13a}$ is a linear or branched alkyl group having 1 to 8 carbon atoms or a substituted or unsubstituted phenyl group. $A_3$ represents a group having a linear or branched substituted or unsubstituted $C_1$ to $C_8$ alkylene group, a substituted or unsubstituted phenylene group, a substituted or unsubstituted naphthalene group or a substituted or unsubstituted group having a heterocyclic structure containing one or more N, S and O. When $A_3$ is a cyclic structure, (a) unsubstituted ring(s) may be further condensed. Further, when two or more units are present, $R_{13}$, $R_{13a}$ and $A_3$ mean as above independently for every unit.

In the case that $A_3$ is a linear and substituted or unsubstituted alkylene group, aminosulfonic acid compounds represented by the following chemical formula (18) can be mentioned.

$$H_2N-A_4-SO_2R_{18} \qquad (18)$$

wherein $R_{18}$ is selected from the group consisting of OH, a halogen atom, ONa, OK and $OR_{18a}$; $R_{18a}$ is a linear or branched alkyl group having 1 to 8 carbon atoms or a substituted or unsubstituted phenyl group; $A_4$ is a linear or branched substituted or unsubstituted $C_1$ to $C_8$ alkylene group and when it is substituted, it may be substituted with an alkyl group having 1 to 20 carbon atoms, an alkoxy group having 1 to 20 carbon atoms, etc.

As a compound represented by the chemical formula (18), 2-aminoethanesulfonic acid (taurine), 3-aminopropanesulfonic acid, 4-aminobutanesulfonic acid, 2-amino-2-methylpropanesulfonic acid, and alkaline metal salts and ester compounds thereof, etc. can be mentioned.

In the case that $A_3$ is a substituted or unsubstituted phenylene group, aminosulfonic acid compounds represented by the following chemical formula (19) can be mentioned.

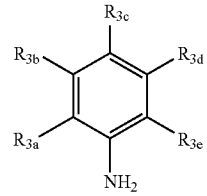

(19)

wherein $R_{3a}$, $R_{3b}$, $R_{3c}$, $R_{3d}$ and $R_{3e}$ are independently selected from the group consisting of $SO_2R_{3f}$, wherein $R_{3f}$ is selected from the group consisting of OH, a halogen atom, ONa, OK and $OR_{3f1}$ wherein $OR_{3f1}$ is a linear or branched alkyl group having 1 to 8 carbon atoms or a substituted or unsubstituted phenyl group, a hydrogen atom, a halogen atom, an alkyl group having 1 to 20 carbon atoms, an alkoxy group having 1 to 20 carbon atoms, OH group and $NH_2$ group and $NO_2$ group, $COOR_{3g}$, wherein $R_{3g}$ represents any of H atom, Na atom and K atom, an acetamide group, OPh group, NHPh group, $CF_3$ group, $C_2F_5$ or $C_3F_7$ group, respectively, wherein Ph represents a phenyl group, and at least one of the groups of these is $SO_2R_{3f}$; and when two or more units are present, $R_{3a}$, $R_{3b}$, $R_{3c}$, $R_{3d}$, $R_{3e}$, $R_{3f}$, $R_{3f1}$ and $R_{3g}$ mean as above independently for every unit.

By using the compound represented by the chemical formula (19), polyhydroxyalkanoate which contains in a molecule one or more units represented by the chemical formula (3) can be obtained.

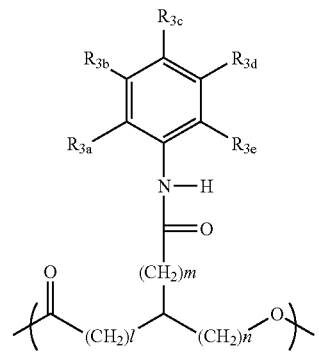

(3)

wherein $R_{3a}$, $R_{3b}$, $R_{3c}$, $R_{3d}$, $R_{3e}$, and l, n and m are similarly defined as the above.

As a compound represented by the chemical formula (19), p-aminobenzenesulfonic acid (sulfanilic acid), m-aminobenzenesulfonic acid, o-aminobenzenesulfonic acid, m-toluidine-4-sulfonic acid, o-toluidine-4-sulfonic acid sodium salt, p-toluidine-2-sulfonic acid, 4-methoxyaniline-2-sulfonic acid, o-anisidine-5-sulfonic acid, p-anisidine-3-sulfonic acid, 3-nitroaniline-4-sulfonic acid, 2-nitroaniline-4-sulfonic acid sodium salt, 4-nitroaniline-2-sulfonic acid sodium salt, 1,5-dinitroaniline-4-sulfonic acid, 2-aminophenol-4-hydroxy-5-nitrobenzenesulfonic acid, 2,4-dimethylaniline-5-sulfonic acid sodium salt, 2,4-dimethylaniline-6-sulfonic acid, 3,4-dimethylaniline-5-sulfonic acid, 4-isopropylaniline-6-sulfonic acid, 4-trifluoromethylaniline-6-sulfonic acid, 3-carboxy-4-hydroxyaniline-5-sulfonic acid, 4-carboxyaniline-6-sulfonic acid and alkaline metal salts and ester compounds thereof, etc. can be mentioned.

In the case that $A_3$ is a substituted or unsubstituted naphthalene group, aminosulfonic acid compounds represented by the following chemical formula (20A) or (20B) can be mentioned.

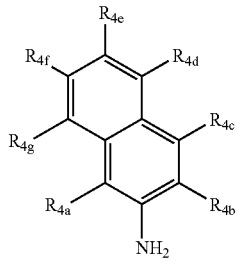

(20A)

wherein $R_{4a}$, $R_{4b}$, $R_{4c}$, $R_{4d}$, $R_{4e}$, $R_{4f}$ and $R_{4g}$ are independently $SO_2R_{4o}$, wherein $R_{4o}$ is selected from the group consisting of OH, a halogen atom, ONa, OK and $OR_{4o1}$, wherein $OR_{4o1}$ is a linear or branched alkyl group having 1 to 8 carbon atoms or a substituted or unsubstituted phenyl group; a hydrogen atom, a halogen atom, an alkyl group having 1 to 20 carbon atoms, an alkoxy group having 1 to 20 carbon atoms, OH group, $NH_2$ group, $NO_2$ group, $COOR_{4p}$ group, wherein $R_{4p}$ represents any of H atom, Na atom and K atom; an acetamide group, OPh group, NHPh group, $CF_3$ group, $C_2F_5$ group or $C_3F_7$ group, wherein Ph represents a phenyl group, respectively, and at least one of these groups is $SO_2R_{4o}$.

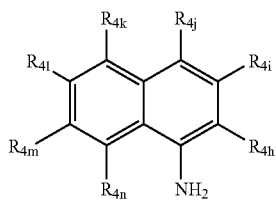

(20B)

wherein $R_{4h}$, $R_{4i}$, $R_{4j}$, $R_{4k}$, $R_{4l}$, $R_{4m}$ and $R_{4n}$ are independently $SO_2R_{4o}$ wherein $R_{4o}$ is selected from the group consisting of OH, a halogen atom, ONa, OK and $OR_{4o1}$, wherein $R_{4o1}$ is a linear or branched alkyl group having 1 to 8 carbon atoms or a substituted or unsubstituted phenyl group; a hydrogen atom, a halogen atom, an alkyl group having 1 to 20 carbon atoms, an alkoxy group having 1 to 20 carbon atoms, OH group, $NH_2$ group, $NO_2$ group, $COOR_{4p}$ group, wherein $R_{4p}$ represents any of H atom, Na atom and K atom; an acetamide group, OPh group, NHPh group, $CF_3$ group, $C_2F_5$ group or $C_3F_7$ group, wherein Ph represents a phenyl group, respectively, and at least one of these groups is $SO_2R_{4o}$.

Polyhydroxyalkanoate which contains one or more units represented by the chemical formula (4A) or (4B) in a molecule can be obtained by using a compound represented by the chemical formula (20A) or (20B).

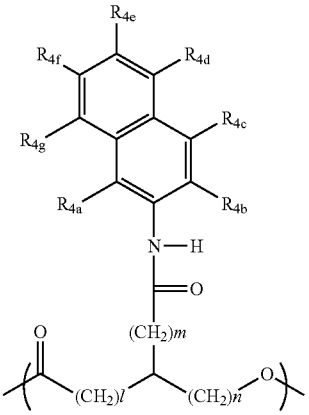

(4A)

wherein $R_{4a}$, $R_{4b}$, $R_{4c}$, $R_{4d}$, $R_{4e}$, $R_{4f}$ and $R_{4g}$ and l, n and m are defined same as above.

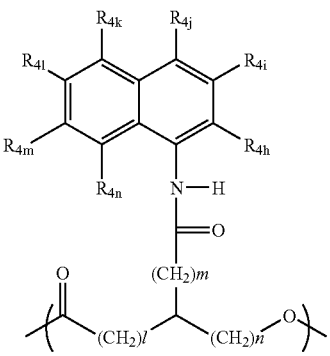

(4B)

wherein $R_{4h}$, $R_{4i}$, $R_{4j}$, $R_{4k}$, $R_{4l}$, $R_{4m}$ and $R_{4n}$ and l, n and m are defined same as above.

As a compound represented by the chemical formula (20A) or (20B), 1-naphthylamine 5-sulfonic acid, 1-naphthylamine 4-sulfonic acid, 1-naphthylamine 8-sulfonic acid, 2-naphthylamine 5-sulfonic acid, 1-naphthylamine 6-sulfonic acid, 1-naphthylamine-7-sulfonic acid, 1-naphthylamine-2-ethoxy-6-sulfonic acid, 1-amino-2-naphthol-4-sulfonic acid, 6-amino-1-naphthol-3-sulfonic acid, 1-amino-8-naphthol-2,4-sulfonic acid monosodium salt, 1-amino-8-naphthol-3,6-disulfonic acid monosodium salt, and alkaline metal salts and ester compounds thereof, etc. can be mentioned.

In the case that $A_3$ is a substituted or unsubstituted group having a heterocyclic structure containing one or more N, S and O, the heterocyclic structure may be any one of pyridine ring, a piperazine ring, a furan ring, a thiol ring, etc. As a compound, sulfonic acid such as 2-aminopyridine-6-sulfonic acid and 2-aminopiperazine-6-sulfonic acid and alkaline metal salts and ester compounds thereof, etc. can be mentioned.

As a group which binds to a sulfonic acid through an ester bond in the case of sulfonic ester, a group having a substituted or unsubstituted aliphatic hydrocarbon structure, a substituted or unsubstituted aromatic ring structure or a substituted or unsubstituted heterocyclic structure can be mentioned as above. Furthermore, a linear or branched alkyl group having 1 to 8 carbon atoms, a substituted or unsubstituted phenyl group is preferable. From the viewpoints such as readiness of esterification, $OCH_3$, $OC_2H_5$, $OC_6H_5$, $OC_3H_7$, $OC_4H_9$, $OCH(CH_3)_2$, $OCH_2C(CH_3)_3$, $OC(CH_3)_3$, etc. are more preferable.

(Production Method of Polyhydroxyalkanoate having a Unit Represented by the Chemical Formula (1))

A reaction of polyhydroxyalkanoate containing a unit represented by the chemical formula (11) with an aminosulfonic acid compound represented by the chemical formula (13) in the present invention is described in detail.

The amount of the compound represented by the chemical formula (13) used in the present invention is in the range of 0.1 to 50.0 times in mol, preferably 1.0 to 20.0 times in mol for a unit represented by the chemical formula (11) used as a starting material.

There is a condensation reaction by thermal dehydration etc. as a method of generating an amide bond from the carboxylic acid and amine of the present invention. Particularly, a method of activating a carboxylic acid moiety by an activating agent to generate an active acyl intermediate and then reacting it with an amine is effective from the viewpoint of such mild reaction conditions so that ester bonds in the polymer main chain may not be cleaved. As an active acyl intermediate, an acid halide, an acid anhydride, active ester, etc. can be mentioned. Particularly, a method of using condensing agent and forming an amide bond all over the same reaction space is preferable from the viewpoint of simplification of productive process. If necessary, it is also possible to perform a condensation reaction with an amine after isolating as an acid halide.

As a usable condensing agent, a phosphate condensing agent used for polycondensation of aromatic polyamide, a carbodiimide condensing agent used for peptide synthesis, an acid chloride condensing agent, etc. can be suitably selected based on the combination of the compounds of chemical formulas (13) and (11).

As the phosphate condensing agent, a phosphorous acid ester condensing agent, a phosphorus chloride condensing agent, a phosphoric acid anhydride condensing agent, a phosphoric acid ester condensing agent, a phosphoric acid amide condensing agent, etc. can be mentioned.

It is possible to use a condensing agent such as a phosphorous acid ester in the reaction of the present invention. Examples of phosphorous acid ester used on this occasion include triphenyl phosphite, diphenyl phosphite, tri-o-tolyl phosphite, di-o-tolyl phosphite, tri-m-tolyl phosphite, di-m-tolyl phosphite, tri-p-tolyl phosphite, di-p-tolyl phosphite, di-o-chlorophenyl phosphite, tri-p-chlorophenyl phosphite, di-p-chlorophenyl phosphite, trimethyl phosphite, triethyl phosphite, etc. Particularly, triphenyl phosphite is used preferably. A metal salt such as lithium chloride and calcium chloride may be also added for the improvement of properties such as solubility of and reactivity the polymer.

As the carbodiimide condensing agent, dicyclohexylcarbodiimide (DCC), N-ethyl-N'-3-dimethylaminopropylcarbodiimide (EDC=WSCI), diisopropylcarbodiimide (DIPC), etc. can be mentioned.

N-hydroxysuccinimide (HONSu), 1-hydroxybenzotriazole (HOBt) or 3-hydroxy-4-oxo-3,4-dihydro-1,2,3-benzotriazine (HOObt), etc. may be used in combination with DCC or WSCI.

The amount of the condensing agent used is in the range of 0.1 to 50 times in mol, preferably 1.0 to 20 times in mol for a unit represented by the chemical formula (11).

A solvent can be used, if needed, in the reaction of the present invention. The solvents to be used include hydrocarbons such as hexane, cyclohexane and heptane, ketones such as acetone and methyl ethyl ketone, ethers such as dimethyl ether, diethyl ether, tetrahydrofuran, halogenated hydrocarbons such as dichloromethane, chloroform, carbon tetrachloride, dichloroethane and trichloroethane, aromatic hydrocarbons such as benzene and toluene, aprotic polar solvents such as N,N-dimethylformamide, dimethylsulfoxide, dimethylacetamide, and hexamethylphosphoramide, pyridine, pyridine derivatives such as picoline, N-methylpyrrolidone, etc. Pyridine, N-methylpyrrolidone, etc. are used particularly preferably. The amount of the solvent used can be suitably determined depending on the start materials, the kind of base, reaction conditions, etc. Although the reaction temperature is not particularly limited in the method of the present invention, it is usually a temperature in the range of $-20°$ C. to the boiling point of the solvent. However, it is preferable to conduct reaction at the optimal temperature for the condensing agent to be used.

In the method of the present invention, the range of reaction time is usually 1 to 48 hours. Particularly, 1 to 10 hours is preferable.

In the present invention, collection and purification of the target polyhydroxyalkanoate from a reaction liquid containing the thus generated polyhydroxyalkanoate having a unit represented by the chemical formula (1) can be carried out by a normal method such as distillation. Alternatively, the target polyhydroxyalkanoate represented by the chemical formula (1) can be precipitated by uniformly mixing a solvent such as water, alcohols such as methanol and ethanol, ethers such as dimethyl ether, diethyl ether and tetrahydrofuran with the reaction liquid, and thereby collecting the same. Polyhydroxyalkanoate having a unit represented by the chemical formula (1) obtained here can be isolated and purified if required. As this isolating and purifying method, there is particularly no restriction and the method of re-precipitating using a solvent insoluble to polyhydroxyalkanoate having a unit represented by the chemical formula (1), method by column chromatography, dialyzing method, etc. can be used.

As another production method of the present invention, when R moiety in the chemical formula (1) is $-A_1-SO_3H$, there is a method of performing methyl esterification to convert the R moiety in chemical formula (1) to $-A_1-SO_3CH_3$ using a methyl esterification agent after condensation reaction with an amine. As a methyl esterification agent, those used for methyl esterification of a fatty acid in gas chromatography analysis can be used. As a methyl esterification method, an acid catalyst method such as hydrochloric acid-methanol method, boron trifluoride-methanol method and sulfuric acid-methanol method, a base catalyst method such as sodium methoxide method, tetramethylguanidine method and trimethylsilyldiazomethane method, etc., can be mentioned. Particularly, trimethylsilyldiazomethane method is preferable since methylation is possible under mild conditions.

As for the solvent used in the reaction of the present invention, hydrocarbons such as hexane, cyclohexane and heptane, alcohols such as methanol and ethanol, halogenated hydrocarbons such as dichloromethane, chloroform, carbon tetrachloride, dichloroethane, and trichloroethane, aromatic hydrocarbons such as benzene and toluene, etc. can be mentioned. Halogenated hydrocarbons are used particularly preferably. The amount of the solvent used can be suitably determined depending on the starting materials, reaction conditions, etc. Although the reaction temperature is not particularly limited in the method of the present invention, it is usually a temperature in the range of −20° C. to 30° C. However, it is preferable to conduct reaction at the optimal temperature for the condensing agent and reagent to be used.

In the meantime, among the polyhydroxyalkanoate having a unit represented by the chemical formula (5) of the present invention, a polyhydroxyalkanoate having a unit represented by the chemical formula (21) can be prepared by using a polyhydroxyalkanoate having a unit represented by the chemical formula (22) as a starting material and oxidizing a double bond moiety in the side chain of the polyhydroxyalkanoate.

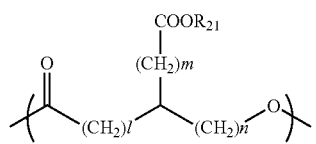
(21)

wherein $R_{21}$ is hydrogen or a salt forming group; l is an integer selected from 1 to 4, n is an integer selected from 1 to 4, m is an integer selected from 0 to 8, when l is 1, 3, and 4, n is an integer selected from 1 to 4, and m is an integer selected from 0 to 8; and when l is 2 and n is 1, 3, and 4, m is an integer selected from 0 to 8; and when l is 2 and n is 2, m is an integer selected from 1 to 8; and when two or more units are present, $R_{21}$, l, m, and n mean as above independently for every unit.

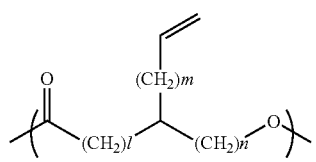
(22)

wherein l is an integer selected from 1 to 4, n is an integer selected from 1 to 4, m is an integer selected from 0 to 8, when l is 1, 3, and 4, n is an integer selected from 1 to 4, and m is an integer selected from 0 to 8; and when l is 2 and n is 1, 3, and 4, m is an integer selected from 0 to 8; and when l is 2 and n is 2, m is an integer selected from 1 to 8; and when two or more units are present, l, m and n mean as above independently for every unit.

As a method of carrying out an oxidative cleavage of a carbon-carbon double bond by an oxidizing agent as above to obtain a carboxylic acid, for example, a method using a permanganic acid salt (J. Chem. Soc., Perkin. Trans. 1,806 (1973)), a method using a dichromate (Org. Synth., 4,698 (1963)), a method using a periodic acid salt (J. Org. Chem., 46,19 (1981)), a method using nitric acid (Japanese Patent Application Laid-Open No. S59-190945), a method using ozone (J. Am. Chem. Soc., 81,4273 (1959)) and etc. are known. Comptes Rendus de l' Academie des Sciences - Series IIC - Chemistry, 4,289-293 (2001) also reports a method of obtaining a carboxylic acid by reacting a carbon-carbon double bond at the end of the side chain of a polyhydroxyalkanoate produced by microorganisms using potassium permanganate as an oxidizing agent under acidic conditions. The same method can also be used in the present invention.

As a permanganic acid salt used as an oxidizing agent, potassium permanganate is commonly used. The amount of a permanganic acid salt used may be usually 1 mol equivalent or more and preferably 2 to 10 mol equivalents per one mol of the unit represented by the chemical formula (22), since the oxidative cleavage reaction is a stoichiometric reaction. In order to adjust the reaction system under acidic conditions, various kinds of inorganic acids and organic acids such as sulfuric acid, hydrochloric acid, acetic acid and nitric acid are usually used. However, when acids such as sulfuric acid, nitric acid, hydrochloric acid and the like are used, ester bond in the main chain may be cleaved, which may cause a decrease in the molecular weight. Therefore, it is preferable to use acetic acid. The amount of acid used is usually 0.2 to 2000 mol equivalent and preferably 0.4 to 1000 mol equivalent per one mol of the unit represented by the chemical formula (22). When it is not less than 0.2 mol equivalent, preferable yield will be resulted, and when it is not more than 2000 mol equivalent, by-product material by decomposition by acid can be reduced, and therefore, it is preferable to adjust it within the limits as defined above. Moreover, crown-ethers can be used in order to promote the reaction. In this case, crown-ether and permanganic acid salt form a complex, and result in an increased reaction activity. As a crown-ether, dibenzo-18-crown-6-ether, dicyclo-18-crown-6-ether and 18-crown-6-ether are generally used. It is usually preferable to use the crown-ether in an amount of usually 0.005 to 2.0 mol equivalent, and preferably 0.01 to 1.5 mol equivalent per one mol of permanganic acid salt.

The solvent used in the oxidation reaction of the present invention is not particularly limited, as long as it is a solvent inactive in the reaction, and, for example, water, acetone; ethers such as tetrahydrofuran and dioxane; aromatic hydrocarbons such as benzene; aliphatic hydrocarbons such as hexane and heptane; halogenated hydrocarbons such as methyl chloride, dichloromethane and chloroform can be used. Among these solvents, if the solubility of polyhydroxyalkanoate is taken into consideration, halogenated hydrocarbons such as methyl chloride, dichloromethane and chloroform and acetone are preferable.

The polyhydroxyalkanoate having a unit represented by the chemical formula (22), permanganic acid salt and acid may be placed as a whole together with a solvent from the beginning or each of them may be continuously or intermittently added to the system to proceed the reaction in oxidation reaction of the present invention. In addition, only permanganic acid salt may be previously dissolved or suspended in a solvent, and subsequently polyhydroxyalkanoate and acid may be added to the system continuously or intermittently to proceed the reaction, or only polyhydroxyalkanoate may be previously dissolved or suspended in a solvent, and subsequently permanganic acid salt and acid may be added to the system continuously or intermittently to proceed the reaction. Furthermore, polyhydroxyalkanoate and acid may be placed previously, and subsequently permanganic acid salt may be added to the system continuously or intermittently to proceed the reaction, or permanganic acid salt and acid are placed previously, and subsequently polyhydroxyalkanoate may be added to the system continuously or intermittently to proceed the reaction, or polyhydroxyalkanoate and permanganic acid salt are placed previously, and subsequently acid may be added to the system continuously or intermittently to proceed the reaction.

It is suitable to adjust the reaction temperature usually to −40 to 40° C., preferably −10 to 30° C. It is suitable to adjust the reaction time to usually 2 to 48 hours, although it is dependent on the stoichiometric ratio of the unit represented by the chemical formula (22) and permanganic acid salt and the reaction temperature.

In addition, polyhydroxyalkanoate containing a unit represented by the chemical formula (24) can be prepared by oxidation reaction from polyhydroxyalkanoate containing a unit represented by the chemical formula (23) by the similar method as the above-described oxidation reaction. This production method is a novel production method.

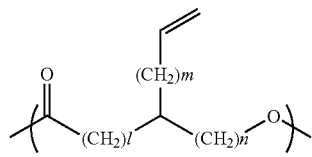
(23)

wherein l is 2, n is 2, and m is 0.

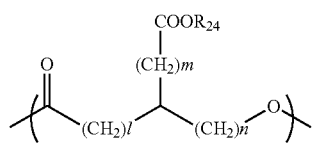
(24)

wherein $R_{24}$ is hydrogen or a salt forming group; l is 2, n is 2, and m is 0.

Among the polyhydroxyalkanoates having a unit represented by the chemical formula (5), a polyhydroxyalkanoate having a unit represented by the chemical formula (12) can be also prepared by using polyhydroxyalkanoate having a unit represented by the chemical formula (10) as a starting material by the method of hydrolyzing the side chain ester moiety in the presence of an acid or alkali, or by the method of hydrocracking including catalytic reduction.

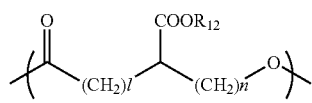
(12)

wherein $R_{12}$ is hydrogen or a salt forming group; l is an integer selected from 1 to 4, n is an integer selected from 1 to 4, and when l is 1, 3, and 4, n is an integer selected from 1 to 4, and when l is 2, n is 1, 3, and 4; and when two or more units are present, l n and $R_{12}$ mean as above independently for every unit.

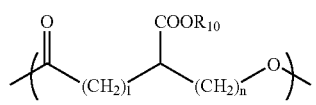
(10)

wherein $R_{10}$ is a substituent selected from a linear or branched alkyl group having 1 to 12 carbon atoms or an aralkyl group; l is an integer selected from 1 to 4, n is an integer selected from 1 to 4, and when l is 1, 3 or 4, n is an integer selected from 1 to 4, and when l is 2, n is 1, 3 or 4; and when two or more units are present, l n and $R_{10}$ mean as above independently for every unit.

When a method of hydrolyzing in the presence of an acid or alkali is used, the method can be performed using a solution of an inorganic acid such as hydrochloric acid, sulfuric acid, nitric acid or phosphoric acid, or an organic acid such as trifluoroacetic acid, trichloroacetic acid, p-toluenesulfonic acid and methanesulfonic acid in water or an organic solvent having affinity to water such as methanol, ethanol, tetrahydrofuran, dioxane, dimethylformamide and dimethylsulfoxide, or alternatively using an aqueous solution of an aqueous caustic alkali such as sodium hydroxide and potassium hydroxide or an alkali carbonate such as sodium carbonate and potassium carbonate or an alcoholic solution of metal alkoxide such as sodium methoxide and sodium ethoxide. It is suitable to adjust the reaction temperature usually to 0 to 40° C. and preferable to 0 to 30° C. It is suitable to adjust the reaction time usually to 0.5 to 48 hours. However, when hydrolyzation is conducted with an acid or alkali, ester bond in the main chain may be cleaved in any case and may cause decrease in molecular weight.

When a method of obtaining a carboxylic acid using a method of hydrocracking including catalytic reduction is used, the method can be performed as follows. That is, hydrogen is made to act in the presence of a reduction catalyst under normal or increased pressure in a proper solvent at a temperature from −20° C. to the boiling point of the solvent used, preferably 0 to 50° C., and catalytic reduction is performed. Examples of the solvent to be used include water, methanol, ethanol, propanol, hexafluoroisopropanol, ethyl acetate, diethyl ether, tetrahydrofuran, dioxane, benzene, toluene, dimethylformamide, pyridine, N-methylpyrrolidone, etc. A mixed solvent of these solvents can also be used. As a reduction catalyst, catalysts such as palladium, platinum, rhodium, etc. by itself or supported on a carrier, or Raney nickel, can be used. It is suitable to adjust the reaction time usually to 0.5 to 72 hours. The thus formed reaction liquid containing a polyhydroxyalkanoate having a unit represented by the chemical formula (10) is collected as a crude polymer by filtering off the catalyst and removing the solvent by distillation etc. The polyhydroxyalkanoate having a unit represented by the chemical formula (10) obtained here can be isolated and purified if required. The method of isolation and purification is not particularly limited and a method of precipitating the polyhydroxyalkanoate having a unit represented by the chemical formula (10) using a solvent which does not dissolve the polyhydroxyalkanoate, a method using column chromatography, a dialyzing method, etc. can be used. However, when catalytic reduction is used, ester bond in the main chain may be also cleaved and may cause a decrease in molecular weight.

In addition, among the polyhydroxyalkanoates having a unit represented by the chemical formula (5), a polyhydroxyalkanoate having a unit represented by the chemical formula (25) can be prepared by esterifying a polyhydroxyalkanoate having a unit represented by the chemical formula (11) as a starting material using an esterification agent.

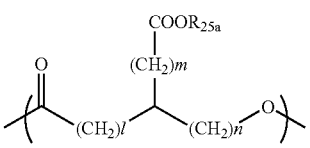
(25)

wherein $R_{25a}$ is a linear or branched alkyl group having 1 to 12 carbon atoms or an aralkyl group or a substituent having a saccharide; l is an integer selected from 1 to 4, n is an integer selected from 1 to 4, m is an integer selected from 0 to 8, and when l is 1, 3, and 4, n is an integer selected from 1 to 4, and m is an integer selected from 0 to 8; and when l is 2 and n is 1, 3, and 4, m is an integer selected from 0 to 8; and when l is 2 and n is 2, m is an integer selected from 1 to 8; and when l is 2, n is 2 and m is 0, $R_{25a}$ is a substituent having a saccharide; and when two or more units are present, $R_{25a}$, and l, m and n mean as above independently for every unit.

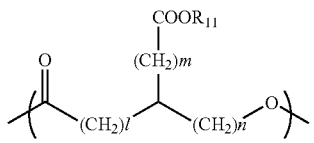
(11)

wherein $R_{11}$ is hydrogen or a salt forming group; l is an integer selected from 1 to 4, n is an integer selected from 1 to 4, and m is an integer selected from 0 to 8; and when two or more units are present, l, m, n and $R_{11}$ mean as above independently for every unit.

As an esterification agent used, diazomethane and DMF dimethyl acetal can be used. For example, polyhydroxyalkanoate having a unit represented by the chemical formula (11) reacts easily with trimethylsilyldiazomethane, DMF dimethyl acetal, DMF diethyl acetal, DMF dipropyl acetal, DMF diisopropyl acetal, DMF-n-butyl acetal, DMF-tert-butyl acetal, or DMF dineopentyl acetal, and gives corresponding esters. In addition, an esterified polyhydroxyalkanoate can be obtained by performing a reaction with an alcohol, for example, methanol, ethanol, propanol, isopropyl alcohol, butyl alcohol, sec-butyl alcohol, tert-butyl alcohol, pentyl alcohol, neopentyl alcohol, hexyl alcohol, heptyl alcohol, octyl alcohol, nonyl alcohol, decyl alcohol and lauryl alcohol and saccharides for introducing a group having a saccharide structure, for example, D-glucose, D-fructose and other saccharides following a method using an acid catalyst or a condensing agent such as DCC.

A polyhydroxyalkanoate represented by the chemical formula (6) of the present invention can be prepared by carrying out polymerization of an intramolecular closed ring compound of ω-hydroxycarboxylic acid represented by the chemical formula (8) in the presence of a catalyst.

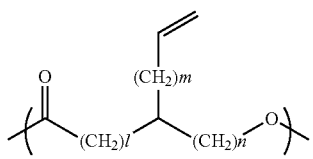
(6)

wherein l is an integer selected from 1 to 4, n is an integer selected from 1 to 4, and m is an integer selected from 0 to 8; and when two or more units are present, l, m and n mean as above independently for every unit.

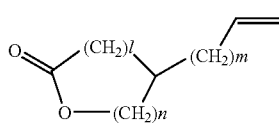
(8)

wherein l is an integer selected from 1 to 4, n is an integer selected from 1 to 4, and m is an integer selected from 0 to 8.

In the production of a polyester containing a unit represented by the chemical formula (6) using an intramolecular closed ring compound of ω-hydroxycarboxylic acid represented by the chemical formula (8) of the present invention, polymerization method is not particularly limited and, for example, solution polymerization method, slurry polymerization method, mass polymerization method, etc. can be adopted. In addition, when a polymerization solvent is used, the solvent is not particularly limited and, for example, inert solvents such as aliphatic hydrocarbons and cyclic hydrocarbons having 5 to 18 carbon atoms, aromatic hydrocarbons having 6 to 20 carbon atoms, tetrahydrofuran, chloroform, o-dichlorobenzene, dioxane, etc. can be used. Conventional ring-opening polymerization catalysts can be used as a catalyst used for this polymerization. Examples thereof include tin dichloride, tin tetrachloride, stannous fluoride, stannous acetate, stannous stearate, stannous octanoate, stannous oxide, stannic oxide, and other tin salts. In addition, triethoxyaluminum, tri-n-propoxyaluminum, tri-iso-propoxyaluminum, tri-n-butoxyaluminum, tri-iso-butoxyaluminum, aluminium chloride, di-iso-propyl zinc, dimethylzinc, diethylzinc, zinc chloride, tetra-n-propoxytitanium, tetra-n-butoxytitan, tetra-n-butoxytitan, tetra-t-butoxytitan, antimony trifluoride, lead oxide, lead stearate, titanium tetrachloride, boron trifluoride, boron trifluoride-ether complex, triethylamine, tributylamine, etc. can be mentioned.

The amount of these catalysts to be used is in the range of 0.0001 to 10% by weight, and preferably in the range of 0.001 to 5% by weight to the total amount of the monomer compound.

In the present invention, conventional polymerization initiators can be used as a polymerization initiator on the occasion of ring-opening polymerization. Specifically, aliphatic alcohols may be any of mono-, di-, or polyhydric alcohols and may be saturated or unsaturated alcohols. Specifically, monoalcohols such as methanol, ethanol, propanol, butanol, pentanol, hexanol, heptanol, nonanol, decanol, lauryl alcohol, myristic alcohol, cetyl alcohol, stearyl alcohol and p-tert-butylbenzyl. alcohol, dialcohols such as ethylene glycol, butanediol, hexanediol, nonanediol and tetramethylene glycol, polyhydric alcohols such as glycerol, sorbitol, xylitol, ribitol and erythritol, and methyl lactate, ethyl lactate, etc. can be used. Although there are some differences according to the conditions depending on the alcohol used, these aliphatic alcohols can be usually used at a ratio of 0.01 to 10% by weight to the total amount of the monomer. In the present invention, the temperature of ring-opening polymerization reaction is in the range of 25 to 200° C., preferably in the range of 50 to 200° C., more preferably in the range of 100 to 180° C.

In the present invention, the ring-opening polymerization reaction may be performed under inert atmosphere such as nitrogen and argon, either reduced or increased pressure, and a catalyst and an alcohol may be added sequentially.

In addition, the polyhydroxyalkanoate having a unit represented by the chemical formula (10) of the present invention can be prepared by carrying out polymerization of an intramolecular closed ring compound of co-hydroxycarboxylic acid represented by the chemical formula (9) in the presence of a catalyst.

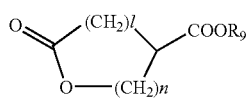
(9)

wherein $R_9$ is a substituent selected from a linear or branched alkyl group having 1 to 12 carbon atoms or an aralkyl group; l is an integer selected from 1 to 4, n is an integer selected from 1 to 4, and when l is 1, 3 or 4, n is an integer selected from 1 to 4, and when l is 2, n is 1, 3 or 4.

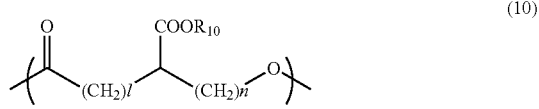

(10)

wherein $R_{10}$ is a substituent selected from a linear or branched alkyl group having 1 to 12 carbon atoms or an aralkyl group; l is an integer selected from 1 to 4, n is an integer selected from 1 to 4, and when l is 1, 3 or 4, n is an integer selected from 1 to 4, and when l is 2, n is 1, 3 or 4; and when two or more units are present, l and n mean as above independently for every unit.

In the production of a polyester containing a unit represented by the chemical formula (10) using an intramolecular closed ring compound of ω-hydroxycarboxylic acid represented by the chemical formula (9) of the present invention, polymerization method is not particularly limited and, for example, solution polymerization method, slurry polymerization method, mass polymerization method, etc. can be adopted. In addition, when a polymerization solvent is used, the solvent is not particularly limited and, for example, inert solvents such as aliphatic hydrocarbons and cyclic hydrocarbons having 5 to 18 carbon atoms, aromatic hydrocarbons having 6 to 20 carbon atoms, tetrahydrofuran, chloroform, o-dichlorobenzene, dioxane, etc. can be used.

In the present invention, conventional ring-opening polymerization catalysts can be used as a catalyst for polymerization. Examples thereof include tin dichloride, tin tetrachloride, stannous fluoride, stannous acetate, stannous stearate, stannous octanoate, stannous oxide, stannic oxide, and other tin salts. In addition, triethoxyaluminum, tri-n-propoxy-aluminum, tri-iso-propoxyaluminum, tri-n-butoxyaluminum, tri-iso-butoxyaluminum, aluminium chloride, di-iso-propyl zinc, dimethylzinc, diethylzinc, zinc chloride, tetra-n-propoxytitanium, tetra-n-butoxytitan, tetra-n-butoxytitan, tetra-t-butoxytitan, antimony trifluoride, lead oxide, lead stearate, titanium tetrachloride, boron trifluoride, boron trifluoride-ether complex, triethylamine, tributylamine, etc. can be mentioned.

The amount of these catalysts to be used is in the range of 0.0001 to 10% by weight, and preferably in the range of 0.001 to 5% by weight to the total amount of the monomer compound.

In the present invention, conventional polymerization initiators can be used as a polymerization initiator on the occasion of ring-opening polymerization. Specifically, aliphatic alcohols may be any of mono-, di-, or polyhydric alcohols and may be saturated or unsaturated alcohols. Specifically, monoalcohols such as methanol, ethanol, propanol, butanol, pentanol, hexanol, heptanol, nonanol, decanol, lauryl alcohol, myristic alcohol, cetyl alcohol, stearyl alcohol and p-tert-butylbenzyl alcohol, dialcohols such as ethylene glycol, butanediol, hexanediol, nonanediol and tetramethylene glycol, polyhydric alcohols such as glycerol, sorbitol, xylitol, ribitol and erythritol, and methyl lactate, ethyl lactate, etc. can be used. Although there are some differences according to the conditions depending on the alcohol used, these aliphatic alcohols can be usually used at a ratio of 0.01 to 10% by weight to the total amount of the monomer. In the present invention, the temperature of ring-opening polymerization reaction is in the range of 25 to 200° C., preferably in the range of 50 to 200° C., more preferably in the range of 100 to 180° C.

In the present invention, the ring-opening polymerization reaction may be performed under inert atmosphere such as nitrogen and argon, either reduced or increased pressure, and a catalyst and an alcohol may be added sequentially.

Although the polyhydroxyalkanoate of the present invention is mainly composed of the unit represented by the chemical formula (1), (5) or (6) shown above, it may be also a copolymer to which a second ingredient etc. is copolymerized in order to change various physical properties such as mechanical properties and decomposition characteristics. For example, a unit represented by the chemical formula (7) can be further contained in a molecule.

(7)

wherein $R_7$ is a linear or branched alkylene group having 1 to 11 carbon atoms, an alkyleneoxyalkylene group, wherein each alkylene group is independently an alkylene group having 1 to 2 carbon atoms, respectively, or an alkylidene group having 1 to 5 carbon atoms which may be substituted with aryl; and when two or more units are present, $R_7$ means as above independently for every unit.

As an example as the second ingredient, a cyclic diester of ω-hydroxycarboxylic acid or a lactone which is an intramolecular closed ring compound of α-hydroxycarboxylic acid can be copolymerized. Furthermore, specific examples of a cyclic diester of α-hydroxycarboxylic acid include intermolecular cyclic diesters such as glycolic acid, lactic acid, α-hydroxybutyric acid, α-hydroxyisobutyric acid, α-hydroxyvaleric acid, α-hydroxyisovaleric acid, α-hydroxy-α-methylbutyric acid, α-hydroxycaproic acid, α-hydroxyisocaproic acid, α-hydroxy-β-methylvaleric acid, α-hydroxyheptanoic acid, mandelic acid, and β-phenyllactic acid. As for the compounds having an asymmetric carbon, any of L-compound, D-compound, racemate and meso compound can be used. The cyclic diester may be also formed from different α-oxy acid molecules. Specifically, a cyclic diester between glycolic acid and lactic acid, and 3-methyl-2,5-diketo-1,4-dioxane etc. can be mentioned. Non-limiting examples of a lactone which is an intramolecular closed ring compound of ω-hydroxycarboxylic acid include β-propiolactone, β-butyrolactone, β-isovalerolactone, β-caprolactone, β-isocaprolactone, β-methyl-β-valerolactone, γ-butyrolactone, γ-valerolactone, δ-valerolactone, ε-caprolactone, 11-oxydecanoic acid lactone, p-dioxanone, 1,5-dioxepan-2-one.

Although the number average molecular weight of polyhydroxyalkanoate obtained by polymerization may vary depending on the conditions such as a type and amount of polymerization catalyst, polymerization temperature and polymerization time, 1,000 to 1,000,000 is preferable.

The molecular weight of polyhydroxyalkanoate can be measured as a relative molecular weight as well as an absolute molecular weight. It can be simply measured by GPC (gel permeation chromatography), etc. As a specific measuring method by GPC, the above-mentioned polyhydroxyalkanoate is beforehand dissolved in a solvent which can dissolve the polyhydroxyalkanoate, and measurement is performed with a similar mobile phase. As a detector, a differential refraction detector (RI) and an ultraviolet detector (UV) can be used depending on the polyhydroxyalkanoate to be measured. The molecular weight can be determined as a relatively compared value with a standard sample (polystyrene, polymethyl methacrylate, etc.). As a solvent, any solvent which dissolves the polymer such as dimethylformamide (DMF), dimethylsulfoxide (DMSO), chloroform, tetrahydrofuran (THF), toluene, and hexafluoroisopropanol (HFIP) may be selected. In the case of a polar solvent, measurement can be also performed while a salt is added.

In the present invention, it is preferable to use a polyhydroxyalkanoate as mentioned above which has a ratio (Mw/Mn) of the weight average molecular weight (Mw) to the number average molecular weight (Mn) measured as mentioned above in the range of 1 to 10.

It should be noted that the reaction solvent, reaction temperature, reaction time, purifying method, etc. in the chemical reaction of the present invention are not limited to the above-mentioned method.

EXAMPLES

Although the present invention is described in more detail referring to Examples given below and, the method of the present invention is not limited only to these Examples.

First, materials used in the Examples are shown as Preparation Examples.

Preparation Examples

The materials used in the Examples can be prepared by the following method.

Preparation Example 1

Production method of tetrahydro-4-(2-propenyl)-2H-pyran-2-one represented by the chemical formula (26) described in Examples 1 to 4.

Tetrahydro-4-(2-propenyl)-2H-pyran-2-one represented by the chemical formula (26) described in Examples 1 to 4 can be prepared by using the method described in Journal of American Chemical Society 2002, 124, 13171-13718 (compound (15) in this document).

122 ml (244.0 mmol) of 2M allyl magnesium chloride-THF solution was placed in an eggplant flask and 500 ml of THF dissolving 27.5 g (122.1 mmol) of zinc bromide was added to this and agitated at 0° C. This was placed in a nitrogen atmosphere and agitated at −78° C. Next, 53.0 g (487.8 mmol) of chlorotrimethylsilane was added, and 200 ml of THF solution dissolving 10.0 g (101.9 mmol) of 3,4-dihydro-2H-pyran-2-one was further added slowly, and agitated at −78° C. for 1 hour. 1N-hydrochloric acid was added to the reaction liquid after the reaction ended and, then diethyl ether was added and the organic layer was extracted. The organic layer was collected, after it was washed with 1N-hydrochloric acid 3 times. The collected organic layer was dried over anhydrous sodium sulfate. After sodium sulfate was removed, crude tetrahydro-4-(2-propenyl)-2H-pyran-2-one was collected by evaporating the solvent: Next, it was purified by silica gel column chromatography and 7.10 g of the target tetrahydro-4-(2-propenyl)-2H-pyran-2-one was obtained by performing drying under reduced pressure. In order to identify the structure of the obtained compound, NMR analysis was performed on the following conditions.

<Measurement Apparatus> FT-NMR: Bruker DPX400 Resonant Frequency: $^1H$=400 MHz
<Measurement Conditions> Nuclide Measured: $^1H$ Solvent Used: $CDCl_3$
Measurement Temperature: room temperature Consequently, it was confirmed that the obtained compound was tetrahydro-4-(2-propenyl)-2H-pyran-2-one which was the object compound.

Preparation Example 2

Production method of tetrahydro-4-(3-butenyl)-2H-pyran-2-one represented by the chemical formula (31) described in Example 5.

7.40 g of the target tetrahydro-4-(3-butenyl)-2H-pyran-2-one was obtained by the same method as in Example 1 except that 122 ml (244.0 mmol) of 2M 3-butenyl magnesium bromide-THF solution was used in place of allyl magnesium chloride described in Example 1.

Preparation Example 3

Production method of 5-(2-propenyl)-2-oxepanone represented by the chemical formula (33) described in Example 6.

5-(2-propenyl)-2-oxepanone represented by chemical formula (33) described in Example 6 is a known compound and, for example, can be obtained by using the method described in Journal of American Chemical Society 1998, 120, 3541-3548 (compound (6e) in the above-mentioned document).

Preparation Example 4

Production method of 7-oxo-4-oxepane carboxylic acid phenylmethyl ester represented by the chemical formula (38) described in Example 8.

7-oxo-4-oxepane carboxylic acid phenylmethyl ester represented by the chemical formula (38) described in Example 8 can be obtained by using the method described in Macromolecules, 2000, 33, 4622 (compound (12) in this document).

The object compound can be obtained by four steps of reactions in more detail.

(Reaction 1)

To 280 ml of methylene chloride suspended solution containing 40.0 g (185.6 mmol) of pyridinium chlorochromate, 25 ml of methylene chloride solution containing 30.0 g (174.2 mmol) of ethyl 4-hydroxycyclohexane carbonate was added and agitated at room temperature for 2 hours, and after that agitated at 45° C. for 5 hours. The reaction solution was subjected to decantation after the reaction ended, and the residue was rinsed with diethyl ether. The reaction solution and the diethyl ether used for rinsing were combined to one solution and purified by silica gel column chromatography followed by distillation under reduced pressure and thereby 29.5 g of ethyl 4-ketocyclohexane carbonate was obtained.

(Reaction 2)

2% sulfuric acid was added to 20.0 g (117.5 mmol) of ethyl 4-ketocyclohexane carbonate and agitated at 115° C. for 4 hours. The reaction solution was extracted with diethyl ether after the reaction ended and dried over magnesium sulfate. Crude product was obtained after the solvent was evaporated. By carrying out decompression distillation of the crude product, 13.5 g of ethyl 4-ketocyclohexane carbonate was obtained.

(Reaction 3)

To an acetone solution containing 12.0 g (84.4 mmol) of 4-ketocyclohexane carboxylic acid and 4.7 g (33.8 mmol) of potassium carbonate, 17.3 g (101.3 mmol) of benzyl bromide was added at room temperature. Next, this was agitated at 60° C. for 3 hours. After the reaction ended, crude product was obtained, and after potassium carbonate was removed by filtration and acetone was evaporated, the crude product was purified by silica gel column chromatography, and 16.5 g of 4-ketocyclohexane carboxylic acid phenylmethyl ester was obtained.

(Reaction 4)

To a chloroform solution containing 16.5 g (71.0 mmol) of benzyl 4-ketocyclohexane carbonate, a chloroform solution containing m-chloroperbenzoic acid was added at room temperature. This was agitated at 65° C. for 2 hours. After the reaction ended, the solution was filtered using Celite, and then an aqueous solution of sodium bicarbonate was added and the liquids were allowed to separate. After the organic layer was collected, it was dried over sodium sulfate. After the solvent was evaporated, 14.7 g of the object compound, 7-oxo-4-oxepane carboxylic acid phenylmethyl ester represented by the chemical formula (38), was obtained by purified by silica gel column chromatography followed by distillation under reduced pressure. In order to identify the structure of the obtained compound, NMR analysis was performed on the same conditions as in Preparation Example 1, and consequently it was confirmed that the obtained compound was 7-oxo-4-oxepane carboxylic acid phenylmethyl ester represented by the chemical formula (38) which was the object compound.

Preparation Example 5

Production method of 7-oxo-3-oxepane carboxylic acid phenylmethyl ester represented by the chemical formula (35) described in Example 7.

7-oxo-3-oxepane carboxylic acid phenylmethyl ester represented by the chemical formula (35) described in Example 7 can be prepared by using the method described in Preparation Example 4. Specifically, the object compound can be obtained by performing (Reaction 3) and (Reaction 4) in the same way except that 3-ketocyclohexanecarboxylic acid is used in place of 4-ketocyclohexane carboxylic acid in (Reaction 3) in Preparation Example 4.

6.0 g of the object compound, 7-oxo-3-oxepane carboxylic acid phenylmethyl ester represented by the chemical formula (35), was obtained by performing a similar method in Preparation Example 4 except that 12.0 g (84.4 mmol) of 3-ketocyclohexanecarboxylic acid was used in place of 4-ketocyclohexane carboxylic acid in Preparation Example 4.

Preparation Example 6

Production method of tetrahydro-6-oxo-2H-pyran-3-carboxylic acid phenylmethyl ester represented by the chemical formula (41) described in Example 9.

Tetrahydro-6-oxo-2H-pyran-3-carboxylic acid phenylmethyl ester represented by the chemical formula (41) described in Example 9 can be prepared by using the method described in Preparation Example 4. Specifically, the object compound can be obtained by performing (Reaction 3) and (Reaction 4) in the same way except that 3-ketocyclopentanecarboxylic acid is used in place of 4-ketocyclohexane carboxylic acid in (Reaction 3) in Preparation Example 4.

4.5 g of the object compound, tetrahydro-6-oxo-2H-pyran-3-carboxylic acid phenylmethyl ester represented by the chemical formula (41), was obtained by performing a similar method in Preparation Example 4 except that 10.8 g (84.4 mmol) of 3-ketocyclopentanecarboxylic acid was used in place of 4-ketocyclohexane carboxylic acid in Preparation Example 4.

Specific examples are shown below.

Example 1

(Synthesis of Polyester Using Tetrahydro-4-(2-propenyl)-2H-pyran-2-one Represented by Chemical Formula (26))

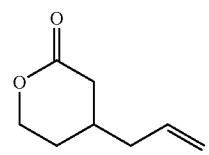

(26)

1.40 g (0.01 mmol) of tetrahydro-4-(2-propenyl)-2H-pyran-2-one represented by the chemical formula (26), 4.0 ml of 0.01 M toluene solution of tin octylate (tin 2-ethylhexanoate), 4.0 ml of 0.01 M toluene solution of p-tert-butylbenzyl alcohol were placed in a polymerization ampoule and after performing drying under reduced pressure for 1 hour and nitrogen purge, it was heat-sealed under reduced pressure, and heated at 150° C. to perform ring-opening polymerization. The reaction was ended after 12 hours and the reaction product was cooled. The obtained polymer was dissolved in chloroform and re-precipitated in methanol in an amount of 10 times of the chloroform required for dissolving the polymer. The precipitation was collected and 0.53 g of polymer was obtained by carrying out drying under reduced pressure. In order to identify the structure of the obtained polymer, NMR analysis was performed on the following conditions.

<Measurement Apparatus> FT-NMR: Bruker DPX400 Resonant Frequency: $^1$H=400 MHz

<Measurement Conditions> Nuclide Measured: $^1$H Solvent Used: TMS/CDCl$_3$

Measurement Temperature: room temperature

Consequently, it was confirmed that the obtained compound was a polyhydroxyalkanoate which consists of a unit represented by the following chemical formula (27).

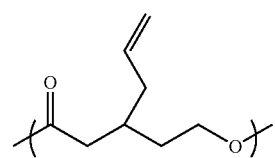

(27)

The average molecular weight of the obtained polyhydroxyalkanoate was estimated by gel permeation chromatography (GPC; TOSOH HLC-8220, column; TOSOH TSK-GEL Super HM-H, solvent; chloroform, polystyrene conversion). Consequently, the number average molecular weight, Mn was 6,200, and weight average molecular weight, Mw was 8,100.

Example 2

(Synthesis of Polyester Using Tetrahydro-4-(2-propenyl)-2H-pyran-2-one and L-lactide)

0.28g (2.0 mmol) of tetrahydro-4-(2-propenyl)-2H-pyran-2-one represented by the chemical formula (26), 1.44 g (10.0 mmol) of L-lactide, 4.8 ml of 0.01 M toluene solution of tin octylate (tin 2-ethylhexanoate), 4.8 ml of 0.01 M toluene solution of p-tert-butylbenzyl alcohol were placed in a polymerization ampoule and after performing drying under reduced pressure for 1 hour and nitrogen purge, it was heat-sealed under reduced pressure, and heated at 150° C. to perform ring-opening polymerization. The reaction was ended after 12 hours and the reaction product was cooled. The obtained polymer was dissolved in chloroform and re-precipitated in methanol in an amount of 10 times of the chloroform required for dissolving the polymer. The precipitation was collected and 1.19 g of polymer was obtained by carrying out drying under reduced pressure. In order to identify the structure of the obtained polymer, NMR analysis was performed on the same conditions as in Example 1 and consequently it was confirmed that the obtained compound was a polyhydroxyalkanoate copolymer which contains a unit represented by the following chemical formula (28) as a monomer unit. It was also confirmed that the ratios of monomer units were 7 mol% for A unit and 93 mol % for B unit.

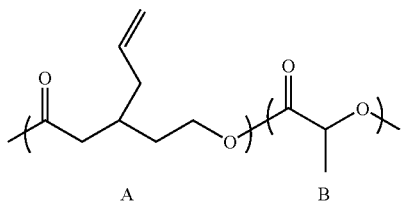

(28)

A  B

The average molecular weight of the obtained polyhydroxyalkanoate was estimated by gel permeation chromatography (GPC; TOSOH HLC-8220, column; TOSOH TSK-GEL Super HM-H, solvent; chloroform, polystyrene conversion). Consequently, the number average molecular weight, Mn was 21,500, and weight average molecular weight, Mw was 29,900.

Example 3

Synthesis of Polyester Using Tetrahydro-4-(2-propenyl)-2H-pyran-2-one and L-Lactide 1.40 g (10.0 mmol) of tetrahydro-4-(2-propenyl)-2H-pyran-2-one represented by the chemical formula (26), 7.21 g (50.0 mmol) of L-lactide, 2.4 ml of 0.1 M toluene solution of tin octylate (tin 2-ethylhexanoate), 2.4 ml of 0.1 M toluene solution of p-tert-butylbenzyl alcohol were placed in a polymerization ampoule and after performing drying under reduced pressure for 1 hour and nitrogen purge, it was heat-sealed under reduced pressure, and heated at 150° C. to perform ring-opening polymerization. The reaction was ended after 12 hours and the reaction product was cooled. The obtained polymer was dissolved in chloroform and re-precipitated in methanol in an amount of 10 times of the chloroform required for dissolving the polymer. The precipitation was collected and 6.21 g of polymer was obtained by carrying out drying under reduced pressure. In order to identify the structure of the obtained polymer, NMR analysis was performed on the same conditions as in Example 1 and consequently it was confirmed that the obtained compound was a polyhydroxyalkanoate copolymer which contains a unit represented by the following chemical formula (29) as a monomer unit. It was also confirmed that the ratios of monomer units were 8 mol% for A unit and 92 mol% for B unit.

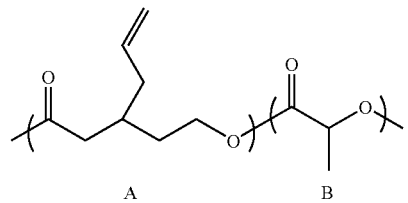

(29)

A  B

The average molecular weight of the obtained polyhydroxyalkanoate was estimated by gel permeation chromatography (GPC; TOSOH HLC-8 220, column; TOSOH TSK-GEL Super HM-H, solvent; chloroform, polystyrene conversion). Consequently, the number average molecular weight, Mn was 23,200, and weight average molecular weight, Mw was 32,200.

Example 4

Synthesis of Polyester Using Tetrahydro-4-(2-propenyl)-2H-pyran-2-one and Mandelide (3,6-diphenyl-1,4-dioxane-2,5-dione)

0.28 g (2.0 mmol) of tetrahydro-4-(2-propenyl)-2H-pyran-2-one represented by the chemical formula (26), 2.68 g (10.0 mmol) of mandelide, 4.8 ml of 0.01 M toluene solution of tin octylate (tin 2-ethylhexanoate), 4.8 ml of 0.01 M toluene solution of p-tert-butylbenzyl alcohol were placed in a polymerization ampoule and after performing drying under reduced pressure for 1 hour and nitrogen purge, it was heat-sealed under reduced pressure, and heated at 150° C. to perform ring-opening polymerization. The reaction was ended after 12 hours and the reaction product was cooled. The obtained polymer was dissolved in chloroform and re-precipitated in methanol in an amount of 10 times of the chloroform required for dissolving the polymer. The precipitation was collected and 1.79 g of polymer was obtained by carrying out drying under reduced pressure.

In order to identify the structure of the obtained polymer, NMR analysis was performed on the same conditions as in Example 1 and consequently it was confirmed that the obtained compound was a polyhydroxyalkanoate copolymer which contains a unit represented by the following chemical formula (30) as a monomer unit. It was also confirmed that the ratios of monomer units were 10 mol % for A unit and 90 mol % for B unit.

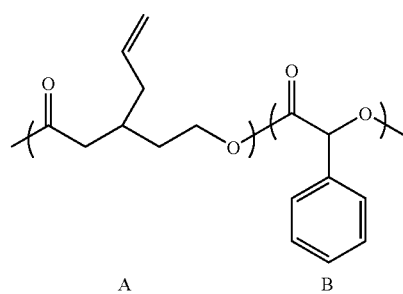

(30)

A  B

The average molecular weight of the obtained polyhydroxyalkanoate was estimated by gel permeation chromatography (GPC; TOSOH HLC-8220, column; TOSOH TSK-GEL Super HM-H, solvent; chloroform, polystyrene conversion). Consequently, the number average molecular weight, Mn was 18,700, and weight average molecular weight, Mw was 28,800.

Example 5

Synthesis of Polyester Using Tetrahydro-4-(2-butenyl)-2H-pyran-2-one Represented by Chemical Formula (31) and 6-Valerolactone

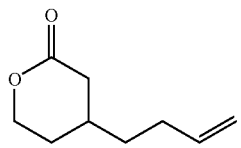

(31)

0.28 g (2.0 mmol) of tetrahydro-4-(3-butenyl)-2H-pyran-2-one represented by the chemical formula (31), 1.00 g (10.0 mmol) of 6-valerolactone, 4.8 ml of 0.01 M toluene solution of tin octylate (tin 2-ethylhexanoate), 4.8 ml of 0.01 M toluene solution of p-tert-butylbenzyl alcohol were placed in a polymerization ampoule and after performing drying under reduced pressure for 1 hour and nitrogen purge, it was heat-sealed under reduced pressure, and heated at 150° C. to perform ring-opening polymerization. The reaction was ended after 12 hours and the reaction product was cooled. The obtained polymer was dissolved in chloroform and re-precipitated in methanol in an amount of 10 times of the chloroform required for dissolving the polymer. The precipitation was collected and 0.89 g of polymer was obtained by carrying out drying under reduced pressure.

In order to identify the structure of the obtained polymer, NMR analysis was performed on the same conditions as in Example 1 and consequently it was confirmed that the obtained compound was a polyhydroxyalkanoate copolymer which contains a unit represented by the following chemical formula (32) as a monomer unit. It was also confirmed that the ratios of monomer units were 14 mol % for A unit and 86 mol % for B unit.

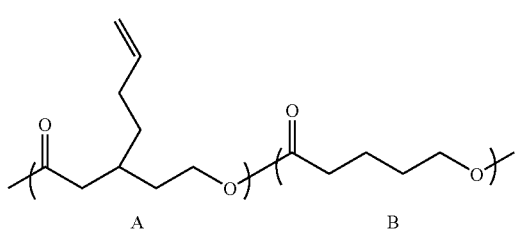

(32)

The average molecular weight of the obtained polyhydroxyalkanoate was estimated by gel permeation chromatography (GPC; TOSOH HLC-8220, column; TOSOH TSK-GEL Super HM-H, solvent; chloroform, polystyrene conversion). Consequently, the number average molecular weight, Mn was 21,000, and weight average molecular weight, Mw was 29,000.

Example 6

Synthesis of Polyester Using 5-(2-propenyl)-2-oxepanone Represented by Chemical Formula (33) and ε-caprolactone)

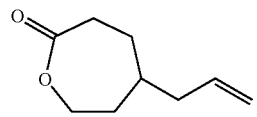

(33)

0.34 g (2.0 mmol) of 5-(2-propenyl)-2-oxepanone represented by the chemical formula (33), 1.14 g (10.0 mmol) of ε-caprolactone, 4.8 ml of 0.01 M toluene solution of tin octylate (tin 2-ethylhexanoate), 4.8 ml of 0.01 M toluene solution of p-tert-butylbenzyl alcohol were placed in a polymerization ampoule and after performing drying under reduced pressure for 1 hour and nitrogen purge, it was heat-sealed under reduced pressure, and heated at 150° C. to perform ring-opening polymerization. The reaction was ended after 12 hours and the reaction product was cooled. The obtained polymer was dissolved in chloroform and re-precipitated in methanol in an amount of 10 times of the chloroform required for dissolving the polymer. The precipitation was collected and 0.96 g of polymer was obtained by carrying out drying under reduced pressure.

In order to identify the structure of the obtained polymer, NMR analysis was performed on the same conditions as in Example 1 and consequently it was confirmed that the obtained compound was a polyhydroxyalkanoate copolymer which contains a unit represented by the following chemical formula (34) as a monomer unit. It was also confirmed that the ratios of monomer units were 13 mol % for A unit and 87 mol % for B unit.

(34)

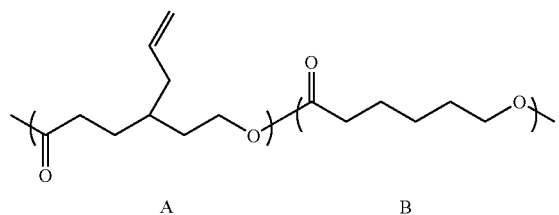

The average molecular weight of the obtained polyhydroxyalkanoate was estimated by gel permeation chromatography (GPC; TOSOH HLC-8220, column; TOSOH TSK-GEL Super HM-H, solvent; chloroform, polystyrene conversion). Consequently, the number average molecular weight, Mn was 22,500, and weight average molecular weight, Mw was 32,000.

Example 7

Synthesis of Polyester Using 7-oxo-3-oxepane Carboxylic Acid Phenylmethyl Ester Represented by Chemical Formula (35) and ε-Caprolactone (35)

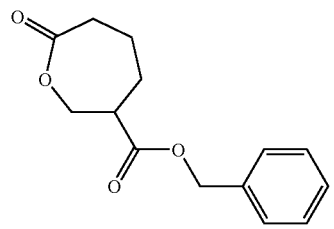

0.50 g (2.0 mmol) of 7-oxo-3-oxepane carboxylic acid phenylmethyl ester represented by the chemical formula (35), 1.14 g (10.0 mmol) of ε-caprolactone, 4.8 ml of 0.01 M toluene solution of tin octylate (tin 2-ethylhexanoate), 4.8 ml of 0.01 M toluene solution of p-tert-butylbenzyl alcohol were placed in a polymerization ampoule and after performing drying under reduced pressure for 1 hour and nitrogen purge, it was heat-sealed under reduced pressure, and heated at 150° C. to perform ring-opening polymerization. The reaction was ended after 12 hours and the reaction product was cooled. The obtained polymer was dissolved in chloroform and re-precipitated in methanol in an amount of 10 times of the chloroform required for dissolving the polymer. The precipitation was collected and 1.23 g of polymer was obtained by carrying out drying under reduced pressure.

In order to identify the structure of the obtained polymer, NMR analysis was performed on the same conditions as in Example 1 and consequently it was confirmed that the obtained compound was a polyhydroxyalkanoate copolymer which contains a unit represented by the following chemical formula (36) as a monomer unit. It was also confirmed that the ratios of monomer units were 14 mol % for A unit and 86 mol % for B unit.

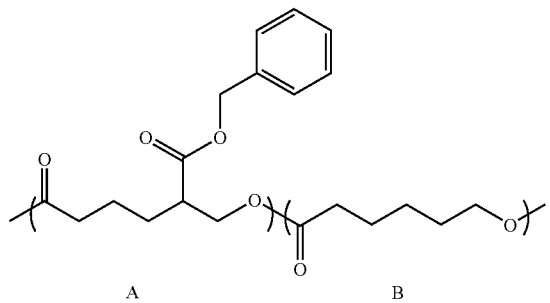

(36)

The average molecular weight of the obtained polyhydroxyalkanoate was estimated by gel permeation chromatography (GPC; TOSOH HLC-8220, column; TOSOH TSK-GEL Super HM-H, solvent; chloroform, polystyrene conversion). Consequently, the number average molecular weight, Mn was 12,000, and weight average molecular weight, Mw was 16,000.

1.00 g of the polyhydroxyalkanoate copolymer represented by the chemical formula (36) obtained here was dissolved in 100 ml of a mixed solvent of dioxane-ethanol (75:25), and 0.22 g of 5% palladium/carbon catalyst was added to this, the inside of the reaction system was filled with hydrogen, and the reaction mixture was agitated at room temperature for one day. After the reaction ended, the reaction mixture was filtered with a 0.25 μm membrane filter in order to remove the catalyst, and the reaction solution was collected. After the solution was condensed, it was dissolved in chloroform, re-precipitation was performed using methanol in an amount of 10 times thereof. The obtained polymer was collected and 0.75 g of polymer was obtained by carrying out drying under reduced pressure.

In order to identify the structure of the obtained polymer, NMR analysis was performed on the same conditions as in Example 1 and consequently it was confirmed that the obtained compound was a polyhydroxyalkanoate copolymer which contains a unit represented by the following chemical formula (37) as a monomer unit. It was also confirmed that the ratios of monomer units were 14 mol % for C unit and 86 mol % for D unit.

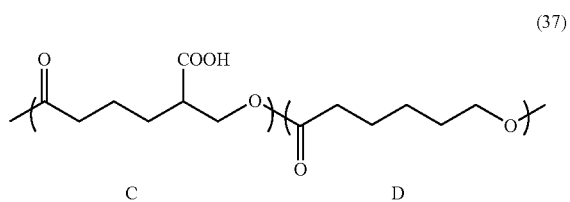

(37)

The average molecular weight of the obtained polyhydroxyalkanoate was estimated by gel permeation chromatography (GPC; TOSOH HLC-8220, column; TOSOH TSK-GEL Super HM-H, solvent; chloroform, polystyrene conversion). Consequently, the number average molecular weight, Mn was 10,600, and weight average molecular weight, Mw was 14,700.

Example 8

Synthesis of Polyester Using 7-oxo-4-oxepane Carboxylic Acid Phenylmethyl Ester Represented by Chemical Formula (38) and L-Lactide

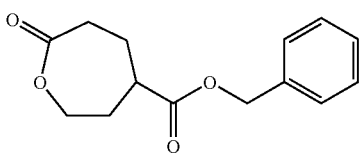

(38)

2.48 g (10.0 mmol) of 7-oxo-4-oxepane carboxylic acid phenylmethyl ester represented by the chemical formula (38), 7.21 g (50.0 mmol) of L-lactide, 2.4 ml of 0.1 M toluene solution of tin octylate (tin 2-ethylhexanoate), 2.4 ml of 0.1 M toluene solution of p-tert-butylbenzyl alcohol were placed in a polymerization ampoule and after performing drying under reduced pressure for 1 hour and nitrogen purge, it was heat-sealed under reduced pressure, and heated at 150° C. to perform ring-opening polymerization. The reaction was ended after 12 hours and the reaction product was cooled. The obtained polymer was dissolved in chloroform and re-precipitated in methanol in an amount of 10 times of the chloroform required for dissolving the polymer. The precipitation was collected and 7.08 g of polymer was obtained by carrying out drying under reduced pressure.

In order to identify the structure of the obtained polymer, NMR analysis was performed on the same conditions as in Example 1 and consequently it was confirmed that the obtained compound was a polyhydroxyalkanoate copolymer which contains a unit represented by the following chemical formula (39) as a monomer unit. It was also confirmed that the ratios of monomer units were 8 mol % for A unit and 92 mol % for B unit.

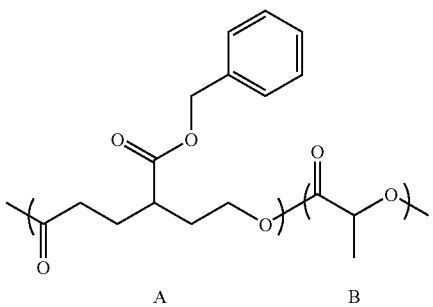

(39)

The average molecular weight of the obtained polyhydroxyalkanoate was estimated by gel permeation chromatography (GPC; TOSOH HLC-8220, column; TOSOH TSK-GEL Super HM-H, solvent; chloroform, polystyrene conversion). Consequently, the number average molecular weight, Mn was 10,300, and weight average molecular weight, Mw was 14,800.

5.00 g of the polyhydroxyalkanoate copolymer represented by the chemical formula (39) obtained here was dissolved in 500 ml of a mixed solvent of dioxane-ethanol (75:25), and 1.10 g of 5% palladium/carbon catalyst was added to this, the inside of the reaction system was filled with hydrogen, and the reaction mixture was agitated at room temperature for one day. After the reaction ended, the reaction mixture was filtered with a 0.25 μm membrane filter in order to remove the catalyst, and the reaction solution was collected. After the solution was condensed, it was dissolved in chloroform, re-precipitation was performed using methanol in an amount of 10 times thereof. The obtained polymer was collected and 3.70 g of polymer was obtained by carrying out drying under reduced pressure.

In order to identify the structure of the obtained polymer, NMR analysis was performed on the same conditions as in Example 1 and consequently it was confirmed that the obtained compound was a polyhydroxyalkanoate copolymer which contains a unit represented by the following chemical formula (40) as a monomer unit. It was also confirmed that the ratios of monomer units were 8 mol % for C unit and 92 mol % for D unit.

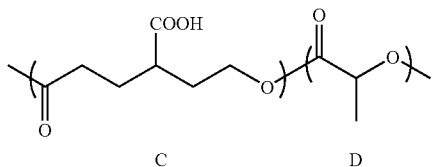

(40)

C  D

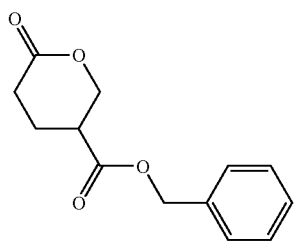

(41)

The average molecular weight of the obtained polyhydroxyalkanoate was estimated by gel permeation chromatography (GPC; TOSOH HLC-8220, column; TOSOH TSK-GEL Super HM-H, solvent; chloroform, polystyrene conversion). Consequently, the number average molecular weight, Mn was 9,500, and weight average molecular weight, Mw was 12,900.

Example 9

Synthesis of Polyester Using Tetrahydro-6-oxo-2H-pyran-3-carboxylic Acid Phenylmethyl Ester Represented by Chemical Formula (41) and Mandelide 0.47g (2.0 mmol) of tetrahydro-6-oxo-2H-pyran-3-carboxylic acid phenylmethyl ester represented by the chemical formula (41), 2.68 g (10.0 mmol) of mandelide, 4.8 ml of 0.01 M toluene solution of tin octylate (tin 2-ethylhexanoate), 4.8 ml of 0.01 M toluene solution of p-tert-butylbenzyl alcohol were placed in a polymerization ampoule and after performing drying under reduced pressure for 1 hour and nitrogen purge, it was heat-sealed under reduced pressure, and heated at 150° C. to perform ring-opening polymerization. The reaction was ended after 12 hours and the reaction product was cooled. The obtained polymer was dissolved in chloroform and re-precipitated in methanol in an amount of 10 times of the chloroform required for dissolving the polymer. The precipitation was collected and 2.06 g of polymer was obtained by carrying out drying under reduced pressure.

In order to identify the structure of the obtained polymer, NMR analysis was performed on the same conditions as in Example 1 and consequently it was confirmed that the obtained compound was a polyhydroxyalkanoate copolymer which contains a unit represented by the following chemical formula (42) as a monomer unit. It was also confirmed that the ratios of monomer units were 7 mol % for A unit and 93 mol % for B unit.

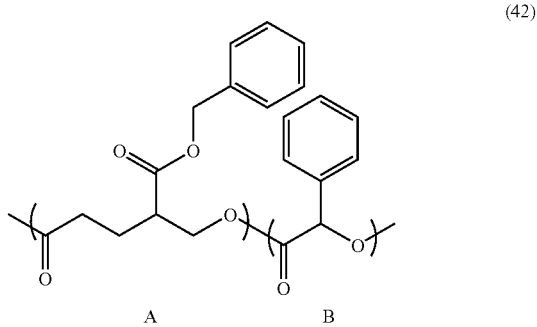

(42)

A  B

The average molecular weight of the obtained polyhydroxyalkanoate was estimated by gel permeation chromatography (GPC; TOSOH HLC-8220, column; TOSOH TSK-GEL Super HM-H, solvent; chloroform, polystyrene conversion). Consequently, the number average molecular weight, Mn was 12,000, and weight average molecular weight, Mw was 16,000.

1.00 g of the polyhydroxyalkanoate copolymer represented by the chemical formula (42) obtained here was dissolved in 100 ml of a mixed solvent of dioxane-ethanol (75:25), and 0.22 g of 5% palladium/carbon catalyst was added to this, the inside of the reaction system was filled with hydrogen, and the reaction mixture was agitated at room temperature for one day. After the reaction ended, the reaction mixture was filtered with a 0.25 μm membrane filter in order to remove the catalyst, and the reaction solution was collected. After the solution was condensed, it was dissolved in chloroform, re-precipitation was performed using methanol in an amount of 10 times thereof. The obtained polymer was collected and 0.73 g of polymer was obtained by carrying out drying under reduced pressure.

In order to identify the structure of the obtained polymer, NMR analysis was performed on the same conditions as in Example 1 and consequently it was confirmed that the obtained compound was a polyhydroxyalkanoate copolymer which contains a unit represented by the following chemical formula (43) as a monomer unit. It was also confirmed that the ratios of monomer units were 7 mol % for C unit and 93 mol % for D unit.

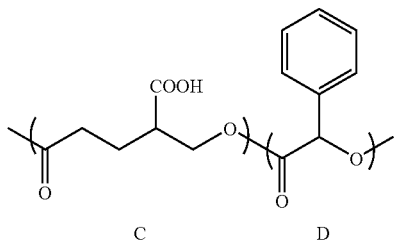

(43)

C   D

The average molecular weight of the obtained polyhydroxyalkanoate was estimated by gel permeation chromatography (GPC; TOSOH HLC-8220, column; TOSOH TSK-GEL Super HM-H, solvent; chloroform, polystyrene conversion). Consequently, the number average molecular weight, Mn was 8,700, and weight average molecular weight, Mw was 12,900.

Example 10

Oxidation reaction of polyhydroxyalkanoate 15 which consists of a unit represented by chemical formula (27) synthesized in Example 1

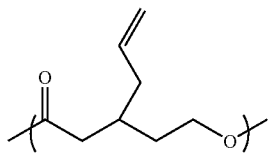

(27)

0.50 g of polyhydroxyalkanoate which consists of a unit represented by the chemical formula (27) obtained in Example 1 was added to an eggplant flask and dissolved with 30 ml of acetone added. This was placed in an ice bath, and 5 ml of acetic acid and 2.83 g of 18-crown-6-ether were added and the mixture was agitated. Next, 2.25 g of potassium permanganate was slowly added on the ice bath, and agitated in an ice bath for 2 hours, and agitated at room temperature for further 18 hours. 60 ml of ethyl acetate was added after the reaction ended, and 45 ml of water was further added. Next, sodium hydrogen sulfite was added until peracid was removed. Then, the pH of the liquid was adjusted to 1 with 1.0 N hydrochloric acid. The organic layer was extracted and washed 3 times with 1.0 N hydrochloric acid. After the organic layer was collected, crude polymer was collected by evaporating the solvent. Next, polymer was collected, after washed with 50 ml of water, 50 ml of methanol and further with 50 ml of water 3 times. Next, it was dissolved in 3 ml of THF, re-precipitation was performed using methanol in an amount of 50 times of THF required for dissolving the polymer. The precipitation was collected and 0.42 g of polymer was obtained by carrying out drying under reduced pressure.

In order to identify the structure of the obtained polymer, NMR analysis was performed on the same conditions as in Example 1 and consequently it was confirmed that the obtained compound was a polyhydroxyalkanoate which contains a unit represented by the following chemical formula (44) as a monomer unit.

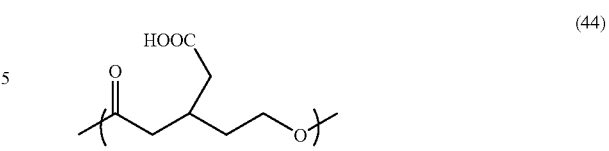

(44)

The average molecular weight of the obtained polyhydroxyalkanoate was estimated by gel permeation chromatography (GPC; TOSOH HLC-8220, column; TOSOH TSK-GEL Super HM-H, solvent; chloroform, polystyrene conversion). Consequently, the number average molecular weight, Mn was 4,700, and weight average molecular weight, Mw was 6,200.

Example 11

Oxidation reaction of polyhydroxyalkanoate which consists of a unit represented by chemical formula (28) synthesized in Example 2

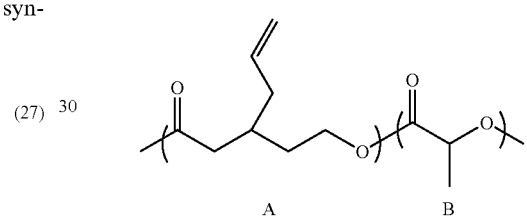

(28)

A   B 0.50 g of a polyhydroxyalkanoate copolymer which consists of a unit represented by the chemical formula (28) (A: 7 mol %, B: 93 mol %) obtained in Example 2 was added to an eggplant flask and dissolved with 30 ml of acetone added. This was placed in an ice bath, and 5 ml of acetic acid and 0.36 g of 18-crown-6-ether were added and the mixture was agitated. Next, 0.28 g of potassium permanganate was slowly added on the ice bath, and agitated in an ice bath for 2 hours, and agitated at room temperature for further 18 hours. 60 ml of ethyl acetate was added after the reaction ended, and 45 ml of water was further added. Next, sodium hydrogen sulfite was added until peracid was removed. Then, the pH of the liquid was adjusted to 1 with 1.0 N hydrochloric acid. The organic layer was extracted and washed 3 times with 1.0 N hydrochloric acid. After the organic layer was collected, crude polymer was collected by evaporating the solvent. Next, polymer was collected, after washed with 50 ml of water, 50 ml of methanol and further with 50 ml of water 3 times. Next, it was dissolved in 3 ml of THF, re-precipitation was performed using methanol in an amount of 50 times of THF required for dissolving the polymer. The precipitation was collected and 0.43 g of polymer was obtained by carrying out drying under reduced pressure.

In order to identify the structure of the obtained polymer, NMR analysis was performed on the same conditions as in Example 1 and consequently it was confirmed that the obtained compound was a polyhydroxyalkanoate which contains a unit represented by the following chemical formula (45) as a monomer unit.

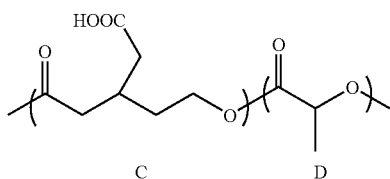

(45)

The average molecular weight of the obtained polyhydroxyalkanoate was estimated by gel permeation chromatography (GPC; TOSOH HLC-8220, column; TOSOH TSK-GEL Super HM-H, solvent; chloroform, polystyrene conversion). Consequently, the number average molecular weight, Mn was 17,400, and weight average molecular weight, Mw was 23,800.

In order to calculate the unit of the obtained polyhydroxyalkanoate furthermore, carboxyl groups at the end of the side chains of the polyhydroxyalkanoate were subjected to methyl esterification using trimethylsilyldiazomethane and the calculation was performed.

30 mg of the target polyhydroxyalkanoate was added to 100 ml-volume eggplant flask and dissolved with 2.1 ml of chloroform and 0.7 ml of methanol added. 0.5 ml of 2 mol/L trimethylsilyldiazomethanehexane solution was added to this, and agitated at room temperature for 1 hour. After the reaction ended, the solvent was removed and the polymer was collected. It was washed with 50 ml of methanol and the polymer was collected after that. 30 mg of polyhydroxyalkanoate was obtained by carrying out drying under reduced pressure.

In order to identify the structure of the obtained polymer, NMR analysis was performed on the same conditions as in Example 1 and consequently it was confirmed that the obtained polyhydroxyalkanoate represented by the chemical formula (45) was a copolymer having a monomer ratio of 7 mol % for C unit and 93 mol % for D unit.

Example 12

Oxidation reaction of polyhydroxyalkanoate which consists of a unit represented by chemical formula (29) synthesized in Example 3

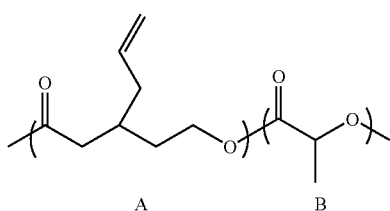

(29)

5.00 g of a polyhydroxyalkanoate copolymer which consists of a unit represented by the chemical formula (29) (A: 8 mol %, B: 92 mol %) obtained in Example 3 was added to an eggplant flask and dissolved with 300 ml of acetone added. This was placed in an ice bath, and 50 ml of acetic acid and 4.09 g of 18-crown-6-ether were added and the mixture was agitated. Next, 3.26 g of potassium permanganate was slowly added on the ice bath, and agitated in an ice bath for 2 hours, and agitated at room temperature for further 18 hours. 600 ml of ethyl acetate was added after the reaction ended, and 450 ml of water was further added. Next, sodium hydrogen sulfite was added until peracid was removed. Then, the pH of the liquid was adjusted to 1 with 1.0 N hydrochloric acid. The organic layer was extracted and washed 3 times with 1.0 N hydrochloric acid. After the organic layer was collected, crude polymer was collected by evaporating the solvent. Next, polymer was collected, after washed with 500 ml of water, 500 ml of methanol and further with 500 ml of water 3 times. Next, it was dissolved in 30 ml of THF, re-precipitation was performed using methanol in an amount of 50 times of THF required for dissolving the polymer. The precipitation was collected and 4.38 g of polymer was obtained by carrying out drying under reduced pressure.

In order to identify the structure of the obtained polymer, NMR analysis was performed on the same conditions as in Example 1 and consequently it was confirmed that the obtained compound was a polyhydroxyalkanoate which contains a unit represented by the following chemical formula (46) as a monomer unit.

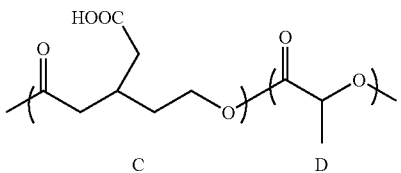

(46)

The average molecular weight of the obtained polyhydroxyalkanoate was estimated by gel permeation chromatography (GPC; TOSOH HLC-8220, column; TOSOH TSK-GEL Super HM-H, solvent; chloroform, polystyrene conversion). Consequently, the number average molecular weight, Mn was 19,800, and weight average molecular weight, Mw was 27,900.

In order to calculate the unit of the obtained polyhydroxyalkanoate furthermore, carboxyl groups at the end of the side chains of the polyhydroxyalkanoate were subjected to methyl esterification using trimethylsilyldiazomethane and the calculation was performed.

30 mg of the target polyhydroxyalkanoate was added to 100 ml-volume eggplant flask and dissolved with 2.1 ml of chloroform and 0.7 ml of methanol added. 0.5 ml of 2 mol/L trimethylsilyldiazomethanehexane solution was added to this, and agitated at room temperature for 1 hour. After the reaction ended, the solvent was removed and the polymer was collected. It was washed with 50 ml of methanol and the polymer was collected after that. 30 mg of polyhydroxyalkanoate was obtained by carrying out drying under reduced pressure.

In order to identify the structure of the obtained polymer, NMR analysis was performed on the same conditions as in Example 1 and consequently it was confirmed that the obtained polyhydroxyalkanoate represented by the chemical formula (46) was a copolymer having a monomer ratio of 8 mol % for C unit and 92 mol % for D unit.

Example 13

Oxidation reaction of polyhydroxyalkanoate which consists of a unit represented by chemical formula (30) synthesized in Example 4

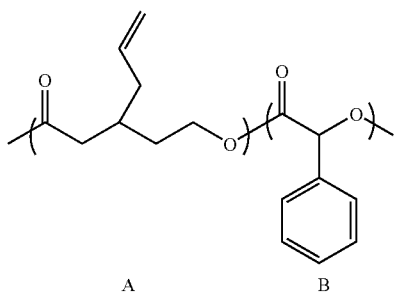

(30)

A    B 0.50 g of a polyhydroxyalkanoate copolymer which consists of a unit represented by the chemical formula (30) (A: 10 mol %, B: 90 mol %) obtained in Example 4 was added to an eggplant flask and dissolved with 30 ml of acetone added. This was placed in an ice bath, and 5 ml of acetic acid and 0.29 g of 18-crown-6-ether were added and the mixture was agitated. Next, 0.23 g of potassium permanganate was slowly added on the ice bath, and agitated in an ice bath for 2 hours, and agitated at room temperature for further 18 hours. 60 ml of ethyl acetate was added after the reaction ended, and 45 ml of water was further added. Next, sodium hydrogen sulfite was added until peracid was removed. Then, the pH of the liquid was adjusted to 1 with 1.0 N hydrochloric acid. The organic layer was extracted and washed 3 times with 1.0 N hydrochloric acid. After the organic layer was collected, crude polymer was collected by evaporating the solvent. Next, polymer was collected, after washed with 50 ml of water, 50 ml of methanol and further with 50 ml of water 3 times. Next, it was dissolved in 3 ml of THF, re-precipitation was performed using methanol in an amount of 50 times of THF required for dissolving the polymer. The precipitation was collected and 0.41 g of polymer was obtained by carrying out drying under reduced pressure.

In order to identify the structure of the obtained polymer, NMR analysis was performed on the same conditions as in Example 1 and consequently it was confirmed that the obtained compound was a polyhydroxyalkanoate which contains a unit represented by the following chemical formula (47) as a monomer unit.

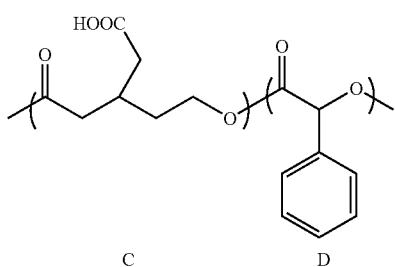

(47)

C    D

The average molecular weight of the obtained polyhydroxyalkanoate was estimated by gel permeation chromatography (GPC; TOSOH HLC-8220, column; TOSOH TSK-GEL Super HM-H, solvent; chloroform, polystyrene conversion). Consequently, the number average molecular weight, Mn was 15,500, and weight average molecular weight, Mw was 20,300.

In order to calculate the unit of the obtained polyhydroxyalkanoate furthermore, carboxyl groups at the end of the side chains of the polyhydroxyalkanoate were subjected to methyl esterification using trimethylsilyldiazomethane and the calculation was performed.

30 mg of the target polyhydroxyalkanoate was added to 100 ml-volume eggplant flask and dissolved with 2.1 ml of chloroform and 0.7 ml of methanol added. 0.5 ml of 2 mol/L trimethylsilyldiazomethanehexane solution was added to this, and agitated at room temperature for 1 hour. After the reaction ended, the solvent was removed and the polymer was collected. It was washed with 50 ml of methanol and the polymer was collected after that. 28 mg of polyhydroxyalkanoate was obtained by carrying out drying under reduced pressure.

NMR analysis was performed on the same conditions as in Example 1 and consequently it was confirmed that the obtained polyhydroxyalkanoate represented by the chemical formula (47) was a copolymer having a monomer ratio of 10 mol % for C unit and 90 mol % for D unit.

Example 14

Oxidation reaction of polyhydroxyalkanoate which consists of a unit represented by chemical formula (32) synthesized in Example 5

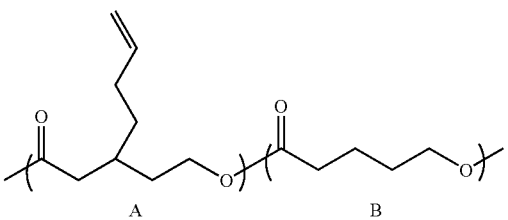

(32)

A    B 0.50 g of a polyhydroxyalkanoate copolymer which consists of a unit represented by the chemical formula (32) (A: 14 mol %, B: 86 mol %) obtained in Example 5 was added to an eggplant flask and dissolved with 30 ml of acetone added. This was placed in an ice bath, and 5 ml of acetic acid and 0.52 g of 18-crown-6-ether were added and the mixture was agitated. Next, 0.42 g of potassium permanganate was slowly added on the ice bath, and agitated in an ice bath for 2 hours, and agitated at room temperature for further 18 hours. 60 ml of ethyl acetate was added after the reaction ended, and 45 ml of water was further added. Next, sodium hydrogen sulfite was added until peracid was removed. Then, the pH of the liquid was adjusted to 1 with 1.0 N hydrochloric acid. The organic layer was extracted and washed 3 times with 1.0 N hydrochloric acid. After the organic layer was collected, crude polymer was collected by evaporating the solvent. Next, polymer was collected, after washed with 50 ml of water, 50 ml of methanol and further with 50 ml of water 3 times. Next, it was dissolved in 3 ml of THF, re-precipitation was performed using methanol in an amount of 50 times of THF required for dissolving the polymer. The precipitation was collected and 0.43 g of polymer was obtained by carrying out drying under reduced pressure.

In order to identify the structure of the obtained polymer, NMR analysis was performed on the same conditions as in Example 1 and consequently it was confirmed that the obtained compound was a polyhydroxyalkanoate which contains a unit represented by the following chemical formula (48) as a monomer unit.

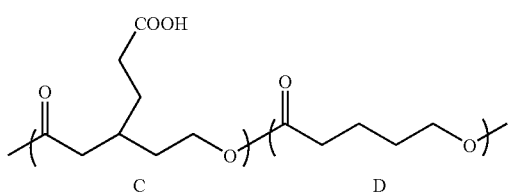

(48)

The average molecular weight of the obtained polyhydroxyalkanoate was estimated by gel permeation chromatography (GPC; TOSOH HLC-8220, column; TOSOH TSK-GEL Super HM-H, solvent; chloroform, polystyrene conversion). Consequently, the number average molecular weight, Mn was 17,900, and weight average molecular weight, Mw was 24,500.

In order to calculate the unit of the obtained polyhydroxyalkanoate furthermore, carboxyl groups at the end of the side chains of the polyhydroxyalkanoate were subjected to methyl esterification using trimethylsilyldiazomethane and the calculation was performed.

30 mg of the target polyhydroxyalkanoate was added to 100 ml-volume eggplant flask and dissolved with 2.1 ml of chloroform and 0.7 ml of methanol added. 0.5 ml of 2 mol/L trimethylsilyldiazomethanehexane solution was added to this, and agitated at room temperature for 1 hour. After the reaction ended, the solvent was removed and the polymer was collected. It was washed with 50 ml of methanol and the polymer was collected after that. 29 mg of polyhydroxyalkanoate was obtained by carrying out drying under reduced pressure.

NMR analysis was performed on the same conditions as in Example 1 and consequently it was confirmed that the obtained polyhydroxyalkanoate represented by the chemical formula (48) was a copolymer having a monomer ratio of 13 mol % for C unit and 87 mol % for D unit.

Example 15

Oxidation reaction of polyhydroxyalkanoate which consists of a unit represented by chemical formula (34) synthesized in Example 6

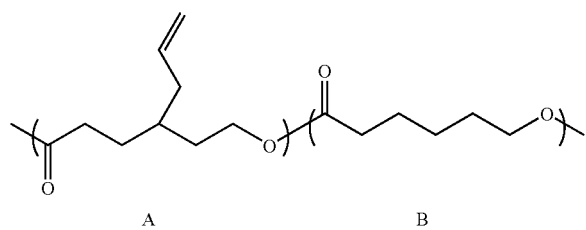

(34)

0.50 g of a polyhydroxyalkanoate copolymer which consists of a unit represented by the chemical formula (34) (A: 13 mol %, B: 87 mol %) obtained in Example 6 was added to an eggplant flask and dissolved with 30 ml of acetone added. This was placed in an ice bath, and 5 ml of acetic acid and 0.43 g of 18-crown-6-ether were added and the mixture was agitated. Next, 0.34 g of potassium permanganate was slowly added on the ice bath, and agitated in an ice bath for 2 hours, and agitated at room temperature for further 18 hours. 60 ml of ethyl acetate was added after the reaction ended, and 45 ml of water was further added. Next, sodium hydrogen sulfite was added until peracid was removed. Then, the pH of the liquid was adjusted to 1 with 1.0 N hydrochloric acid. The organic layer was extracted and washed 3 times with 1.0 N hydrochloric acid. After the organic layer was collected, crude polymer was collected by evaporating the solvent. Next, polymer was collected, after washed with 50 ml of water, 50 ml of methanol and further with 50 ml of water 3 times. Next, it was dissolved in 3 ml of THF, re-precipitation was performed using methanol in an amount of 50 times of THF required for dissolving the polymer. The precipitation was collected and 0.44 g of polymer was obtained by carrying out drying under reduced pressure.

In order to identify the structure of the obtained polymer, NMR analysis was performed on the same conditions as in Example 1 and consequently it was confirmed that the obtained compound was a polyhydroxyalkanoate which contains a unit represented by the following chemical formula (49) as a monomer unit.)

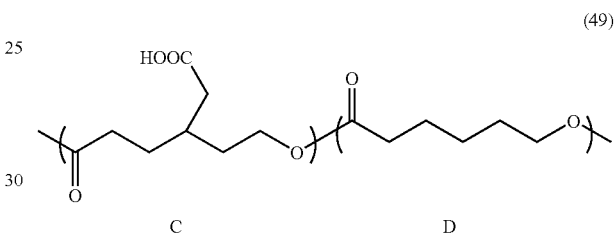

(49)

The average molecular weight of the obtained polyhydroxyalkanoate was estimated by gel permeation chromatography (GPC; TOSOH HLC-8220, column; TOSOH TSK-GEL Super HM-H, solvent; chloroform, polystyrene conversion). Consequently, the number average molecular weight, Mn was 18,900, and weight average molecular weight, Mw was 27,600.

In order to calculate the unit of the obtained polyhydroxyalkanoate furthermore, carboxyl groups at the end of the side chains of the polyhydroxyalkanoate were subjected to methyl esterification using trimethylsilyldiazomethane and the calculation was performed.

30 mg of the target polyhydroxyalkanoate was added to 100 ml-volume eggplant flask and dissolved with 2.1 ml of chloroform and 0.7 ml of methanol added. 0.5 ml of 2 mol/L trimethylsilyldiazomethane-hexane solution was added to this, and agitated at room temperature for 1 hour. After the reaction ended, the solvent was removed and the polymer was collected. It was washed with 50 ml of methanol and the polymer was collected after that. 28 mg of polyhydroxyalkanoate was obtained by carrying out drying under reduced pressure.

NMR analysis was performed on the same conditions as in Example 1 and consequently it was confirmed that the obtained polyhydroxyalkanoate represented by the chemical formula (49) was a copolymer having a monomer ratio of 12 mol % for C unit and 88 mol % for D unit.

Example 16

Condensation reaction of polyhydroxyalkanoate which consist of a unit represented by chemical formula (46) synthesized in Example 12 and 2-aminobenzenesulfonic acid

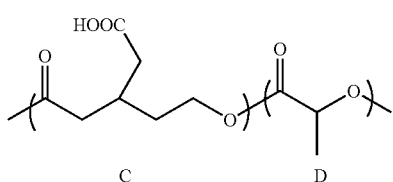

(46)

C  D

In a nitrogen atmosphere, 0.40 g of the polyhydroxyalkanoate copolymer which consists of a unit represented by the chemical formula (46) (C: 8 mol %, D: 92 mol %) obtained in Example 12, 0.35 g of 2-aminobenzenesulfonic acid were added to a 100 ml three-necked flask and agitated with 15.0 ml of pyridine added, and then 1.06 ml of triphenyl phosphite was added and heated at 120° C. for 6 hours. After the reaction ended, re-precipitation was performed from 150 ml of ethanol to collect the product. The obtained polymer was washed with 1N hydrochloric acid for one day and further washed by agitating in water for one day, and 0.34 g of polymer was obtained by carrying out drying under reduced pressure.

The structure of the obtained polymer was determined by analyzing with $^1$H-NMR (FT-NMR: Bruker DPX400; resonant frequency: 400 MHz; nuclide measured: $^1$H; solvent used: d-DMSO; measurement temperature: room temperature) and Fourier transformation-infrared absorption (FT-IR) spectrum (Nicolet AVATAR360 FT-IR). As a result of performing IR measurement, the peak of 1,695 cm$^{-1}$ resulted from carboxylic acid decreased, and a peak resulted from amide group at 1,658 cm$^{-1}$ was newly observed.

The results of $^1$H-NMR showed a shift of the peak resulted from the aromatic ring in 2-aminobenzenesulfonic acid structure and accordingly it was confirmed that the obtained polymer was a polyhydroxyalkanoate containing a unit represented by the following chemical formula (50) as a monomer unit.

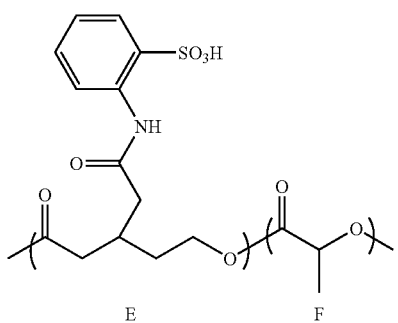

(50)

E  F

As for the ratio of the units in the polyhydroxyalkanoate represented by the chemical formula (50), it was confirmed that it was a copolymer having a monomer ratio of 8 mol % for unit E and 92 mol % for unit F.

The average molecular weight of the obtained polyhydroxyalkanoate was estimated by gel permeation chromatography (GPC; TOSOH HLC-8120, column; Polymer Laboratories PLgel 5 μ MIXED-C, solvent; DMF/LiBr 0.1% (w/v), polystyrene conversion). Consequently, the number average molecular weight, Mn was 16,700, and weight average molecular weight, Mw was 24,700.

Example 17

Condensation reaction of polyhydroxyalkanoate which consist of a unit represented by chemical formula (46) synthesized in Example 12 and 4-aminobenzenesulfonic acid

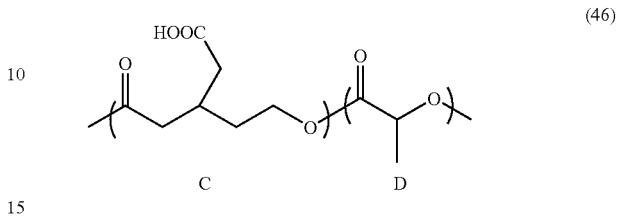

(46)

C  D

In a nitrogen atmosphere, 0.40 g of the polyhydroxyalkanoate copolymer which consists of a unit represented by the chemical formula (46) (C: 8 mol %, D: 92 mol %) obtained in Example 12, 0.35 g of 4-aminobenzenesulfonic acid were added to a 100 ml three-necked flask and agitated with 15.0 ml of pyridine added, and then 1.06 ml of triphenyl phosphite was added and heated at 120° C. for 6 hours. After the reaction ended, re-precipitation was performed from 150 ml of ethanol to collect the product. The obtained polymer was washed with 1N hydrochloric acid for one day and further washed by agitating in water for one day, and 0.32 g of polymer was obtained by carrying out drying under reduced pressure.

The structure of the obtained polymer was determined by analyzing with $^1$H-NMR (FT-NMR: Bruker DPX400; resonant frequency: 400 MHz; nuclide measured: $^1$H; solvent used: d-DMSO; measurement temperature: room temperature) and Fourier transformation-infrared absorption (FT-IR) spectrum (Nicolet AVATAR360 FT-IR). As a result of performing IR measurement, the peak of 1,695 cm$^{-1}$ resulted from carboxylic acid decreased, and a peak resulted from amide group at 1,658 cm$^{-1}$ was newly observed.

The results of $^1$H-NMR showed a shift of the peak resulted from the aromatic ring in 4-aminobenzenesulfonic acid structure and accordingly it was confirmed that the obtained polymer was a polyhydroxyalkanoate containing a unit represented by the following chemical formula (51) as a monomer unit.

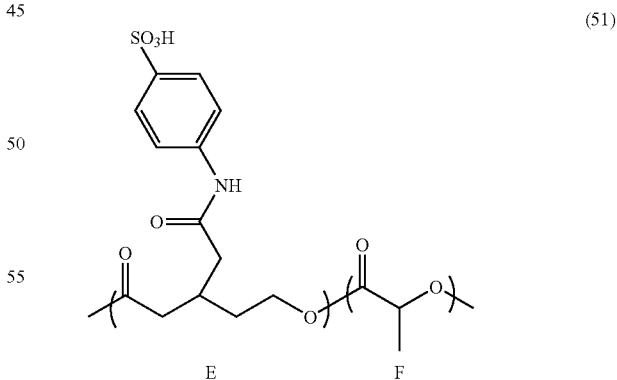

(51)

E  F

As for the ratio of the units in the polyhydroxyalkanoate represented by the chemical formula (51), it was confirmed that it was a copolymer having a monomer ratio of 8 mol % for unit E and 92 mol % for unit F.

The average molecular weight of the obtained polymer was estimated by gel permeation chromatography (GPC; TOSOH HLC-8120, column; Polymer Laboratories PLgel 5 μ

MIXED-C, solvent; DMF/LiBr 0.1% (w/v), polystyrene conversion). Consequently, the number average molecular weight, Mn was 16,100, and weight average molecular weight, Mw was 24,300.

Example 18

Condensation reaction of the polyhydroxyalkanoate which consist of a unit represented by chemical formula (46) synthesized in Example 12 and p-toluidine-2-sulfonic acid

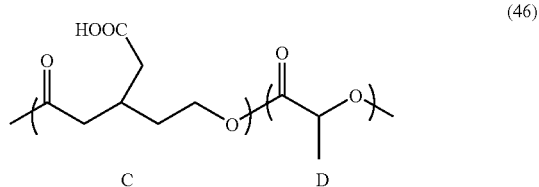

(46)

In a nitrogen atmosphere, 0.40 g of the polyhydroxyalkanoate copolymer which consists of a unit represented by the chemical formula (46) (C: 8 mol %, D: 92 mol %) obtained in Example 12, 0.38 g of p-toluidine-2-sulfonic acid were added to a 100 ml three-necked flask and agitated with 15.0 ml of pyridine added, and then 1.06 ml of triphenyl phosphite was added and heated at 120° C. for 6 hours. After the reaction ended, re-precipitation was performed from 150 ml of ethanol to collect the product. The obtained polymer was washed with 1N hydrochloric acid for one day and further washed by agitating in water for one day, and 0.35 g of polymer was obtained by carrying out drying under reduced pressure.

The structure of the obtained polymer was determined by analyzing with $^1$H-NMR (FT-NMR: Bruker DPX400; resonant frequency: 400 MHz; nuclide measured: $^1$H; solvent used: d-DMSO; measurement temperature: room temperature) and Fourier transformation-infrared absorption (FT-IR) spectrum (Nicolet AVATAR360 FT-IR). As a result of performing IR measurement, the peak of 1,695 cm$^{-1}$ resulted from carboxylic acid decreased, and a peak resulted from amide group at 1,658 cm$^{-1}$ was newly observed.

The results of $^1$H-NMR showed a shift of the peak resulted from the aromatic ring in p-toluidine-2-sulfonic acid structure and accordingly it was confirmed that the obtained polymer was a polyhydroxyalkanoate containing a unit represented by the following chemical formula (52) as a monomer unit.

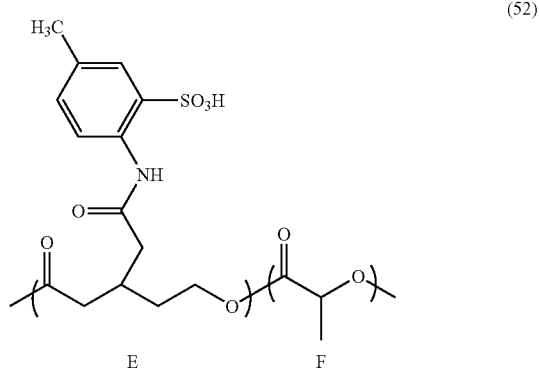

(52)

As for the ratio of the units in the polyhydroxyalkanoate represented by the chemical formula (52), it was confirmed that it was a copolymer having a monomer ratio of 8 mol % for unit E and 92 mol % for unit F.

The average molecular weight of the obtained polyhydroxyalkanoate was estimated by gel permeation chromatography (GPC; TOSOH HLC-8120, column; Polymer Laboratories PLgel 5 μ MIXED-C, solvent; DMF/LiBr 0.1% (w/v), polystyrene conversion). Consequently, the number average molecular weight, Mn was 15,700, and weight average molecular weight, Mw was 24,600.

Example 19

Condensation reaction of polyhydroxyalkanoate which consist of a unit represented by chemical formula (46) synthesized in Example 12 and 2-aminobenzenesulfonic acid phenyl ester

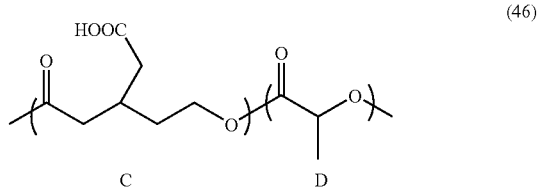

(46)

In a nitrogen atmosphere, 0.40 g of the polyhydroxyalkanoate copolymer which consists of a unit represented by the chemical formula (46) (C: 8 mol %, D: 92 mol %) obtained in Example 12, 0.51 g of 2-aminobenzenesulfonic acid phenyl ester were added to a 100 ml three-necked flask and agitated with 15.0 ml of pyridine added, and then 1.06 ml of triphenyl phosphite was added and heated at 120° C. for 6 hours. After the reaction ended, re-precipitation was performed from 150 ml of ethanol to collect the product. The obtained polymer was washed with 1N hydrochloric acid for one day and further washed by agitating in water for one day, and 0.38 g of polymer was obtained by carrying out drying under reduced pressure.

The structure of the obtained polymer was determined by analyzing with $^1$H-NMR (FT-NMR: Bruker DPX400; resonant frequency: 400 MHz; nuclide measured: $^1$H; solvent used: d-DMSO; measurement temperature: room temperature) and Fourier transformation-infrared absorption (FT-IR) spectrum (Nicolet AVATAR360 FT-IR). As a result of performing IR measurement, the peak of 1,695 cm$^{-1}$ resulted from carboxylic acid decreased, and a peak resulted from amide group at 1,658 cm$^{-1}$ was newly observed.

The results of $^1$H-NMR showed a shift of the peak resulted from the aromatic ring in 2-aminobenzenesulfonic acid phenyl ester structure and accordingly it was confirmed that the obtained polymer was a polyhydroxyalkanoate containing a unit represented by the following chemical formula (53) as a monomer unit.

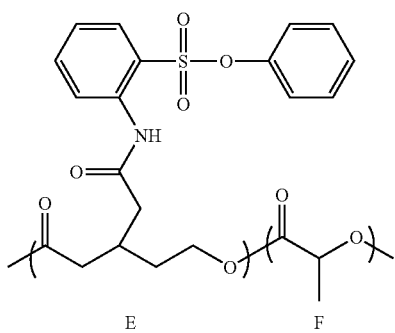

(53)

As for the ratio of the units in the polyhydroxyalkanoate represented by the chemical formula (53), it was confirmed that it was a copolymer having a monomer ratio of 8 mol % for unit E and 92 mol % for unit F.

The average molecular weight of the obtained polyhydroxyalkanoate was estimated by gel permeation chromatography (GPC; TOSOH HLC-8120, column; Polymer Laboratories PLgel 5 μ MIXED-C, solvent; DMF/LiBr 0.1% (w/v), polystyrene conversion). Consequently, the number average molecular weight, Mn was 17,100, and weight average molecular weight, Mw was 24,600.

Example 20

Condensation reaction of the polyhydroxyalkanoate which consist of a unit represented by chemical formula (46) synthesized in Example 12 and 2-amino-1-naphthalenesulfonic acid

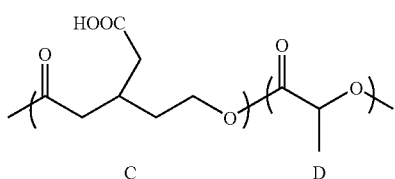

(46)

In a nitrogen atmosphere, 0.40 g of the polyhydroxyalkanoate copolymer which consists of a unit represented by the chemical formula (46) (C: 8 mol %, D: 92 mol %) obtained in Example 12, 0.45 g of 2-amino-1-naphthalenesulfonic acid were added to a 100 ml three-necked flask and agitated with 15.0 ml of pyridine added, and then 1.06 ml of triphenyl phosphite was added and heated at 120° C. for 6 hours. After the reaction ended, re-precipitation was performed from 150 ml of ethanol to collect the product. The obtained polymer was washed with 1N hydrochloric acid for one day and further washed by agitating in water for one day, and 0.34 g of polymer was obtained by carrying out drying under reduced pressure.

The structure of the obtained polymer was determined by analyzing with $^1$H-NMR (FT-NMR: Bruker DPX400; resonant frequency: 400 MHz; nuclide measured: $^1$H; solvent used: d-DMSO; measurement temperature: room temperature) and Fourier transformation-infrared absorption (FT-IR) spectrum (Nicolet AVATAR360 FT-IR). As a result of performing IR measurement, the peak of 1,695 cm$^{-1}$ resulted from carboxylic acid decreased, and a peak resulted from amide group at 1,658 cm$^{-1}$ was newly observed.

The results of $^1$H-NMR showed a shift of the peak resulted from the aromatic ring in 2-amino-1-naphthalenesulfonic acid structure and accordingly it was confirmed that the obtained polymer was a polyhydroxyalkanoate containing a unit represented by the following chemical formula (54) as a monomer unit.

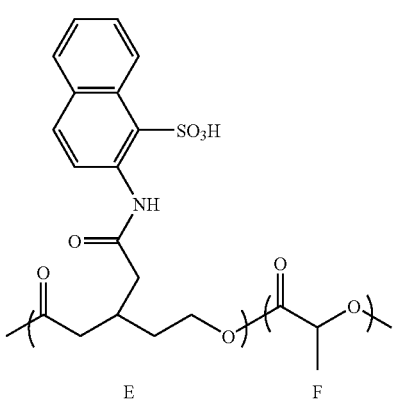

(54)

As for the ratio of the units in the polyhydroxyalkanoate represented by the chemical formula (54), it was confirmed that it was a copolymer having a monomer ratio of 8 mol % for unit E and 92 mol % for unit F.

The average molecular weight of the obtained polyhydroxyalkanoate was estimated by gel permeation chromatography (GPC; TOSOH HLC-8120, column; Polymer Laboratories PLgel 5 μ MIXED-C, solvent; DMF/LiBr 0.1% (w/v), polystyrene conversion). Consequently, the number average molecular weight, Mn was 16,900, and weight average molecular weight, Mw was 25,700.

Example 21

Condensation reaction of the polyhydroxyalkanoate which consist of a unit represented by chemical formula (46) synthesized in Example 12 and 2-amino-2-methylpropanesulfonic acid

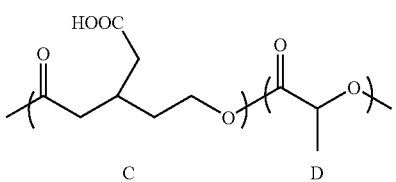

(46)

In a nitrogen atmosphere, 0.40 g of the polyhydroxyalkanoate copolymer which consists of a unit represented by the chemical formula (46) (C: 8 mol %, D: 92 mol %) obtained in Example 12, 0.31 g of 2-amino-2-methylpropanesulfonic acid were added to a 100 ml three-necked flask and agitated with 15.0 ml of pyridine added, and then 1.06 ml of triphenyl phosphite was added and heated at 120° C. for 6 hours. After the reaction ended, re-precipitation was performed from 150 ml of ethanol to collect the product. The obtained polymer was washed with 1N hydrochloric acid for one day and further washed by agitating in water for one day, and 0.31 g of polymer was obtained by carrying out drying under reduced pressure.

The structure of the obtained polymer was determined by analyzing with $^1$H-NMR (FT-NMR: Bruker DPX400; resonant frequency: 400 MHz; nuclide measured: $^1$H; solvent used: d-DMSO; measurement temperature: room temperature) and Fourier transformation-infrared absorption (FT-IR) spectrum (Nicolet AVATAR360 FT-IR). As a result of performing IR measurement, the peak of 1,695 cm$^{-1}$ resulted from carboxylic acid decreased, and a peak resulted from amide group at 1,668 cm$^{-1}$ was newly observed.

The results of $^1$H-NMR showed a shift of the peak resulted from the methylene of 2-amino-2-methylpropanesulfonic acid structure and accordingly it was confirmed that the obtained polymer was a polyhydroxyalkanoate containing a unit represented by the following chemical formula (55) as a monomer unit.

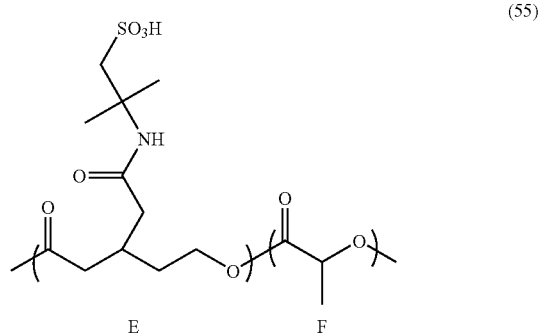

(55)

As for the ratio of the units in the polyhydroxyalkanoate represented by the chemical formula (55), it was confirmed that it was a copolymer having a monomer ratio of 8 mol % for unit E and 92 mol % for unit F.

The average molecular weight of the obtained polyhydroxyalkanoate was estimated by gel permeation chromatography (GPC; TOSOH HLC-8120, column; Polymer Laboratories PLgel 5 μ MIXED-C, solvent; DMF/LiBr 0.1% (w/v), polystyrene conversion). Consequently, the number average molecular weight, Mn was 17,300, and weight average molecular weight, Mw was 24,600.

Example 22

Condensation reaction of polyhydroxyalkanoate which consist of a unit represented by chemical formula (47) synthesized in Example 13 and 3-aminobenzenesulfonic acid

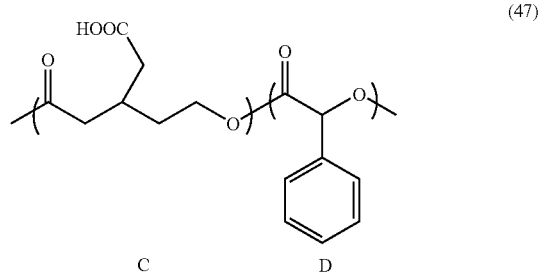

(47)

In a nitrogen atmosphere, 0.40 g of the polyhydroxyalkanoate copolymer which consists of a unit represented by the chemical formula (47) (C: 10 mol %, D: 90 mol %) obtained in Example 13, 0.25 g of 3-aminobenzenesulfonic acid were added to a 100 ml three-necked flask and agitated with 15.0 ml of pyridine added, and then 0.76 ml of triphenyl phosphite was added and heated at 120° C. for 6 hours. After the reaction ended, re-precipitation was performed from 150 ml of ethanol to collect the product. The obtained polymer was washed with 1N hydrochloric acid for one day and further washed by agitating in water for one day, and 0.33 g of polymer was obtained by carrying out drying under reduced pressure.

The structure of the obtained polymer was determined by analyzing with $^1$H-NMR (FT-NMR: Bruker DPX400; resonant frequency: 400 MHz; nuclide measured: $^1$H; solvent used: d-DMSO; measurement temperature: room temperature) and Fourier transformation-infrared absorption (FT-IR) spectrum (Nicolet AVATAR360 FT-IR). As a result of performing IR measurement, the peak of 1,695 cm$^{-1}$ resulted from carboxylic acid decreased, and a peak resulted from amide group at 1,658 cm$^{-1}$ was newly observed.

The results of $^1$H-NMR showed a shift of the peak resulted from the aromatic ring of 3-aminobenzenesulfonic acid structure and accordingly it was confirmed that the obtained polymer was a polyhydroxyalkanoate containing a unit represented by the following chemical formula (56) as a monomer unit.

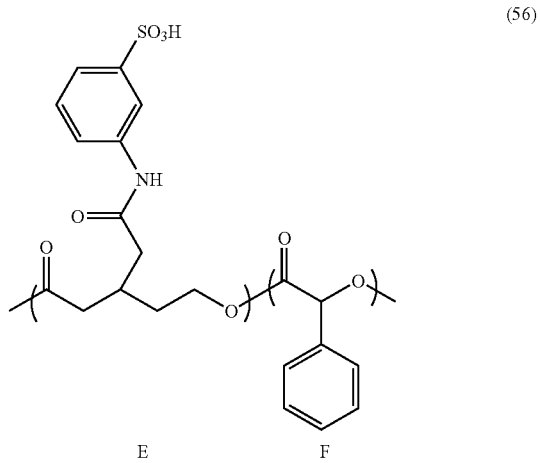

(56)

As for the ratio of the units in the polyhydroxyalkanoate represented by the chemical formula (56), it was confirmed that it was a copolymer having a monomer ratio of 10 mol % for unit E and 90 mol % for unit F.

The average molecular weight of the obtained polyhydroxyalkanoate was estimated by gel permeation chromatography (GPC; TOSOH HLC-8120, column; Polymer Laboratories PLgel 5 μ MIXED-C, solvent; DMF/LiBr 0.1% (w/v), polystyrene conversion). Consequently, the number average molecular weight, Mn was 13,100, and weight average molecular weight, Mw was 17,700.

Example 23

Condensation reaction of the polyhydroxyalkanoate which consist of a unit represented by chemical formula (48) synthesized in Example 14 and 4-methoxyaniline-2-sulfonic acid

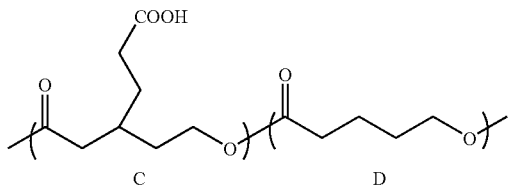

(48)

In a nitrogen atmosphere, 0.40 g of the polyhydroxyalkanoate copolymer which consists of a unit represented by the chemical formula (48) (C: 13 mol %, D: 87 mol %) obtained in Example 14, 0.48g of 4-methoxyaniline-2-sulfonic acid were added to a 100 ml three-necked flask and agitated with 15.0 ml of pyridine added, and then 1.24 ml of triphenyl phosphite was added and heated at 120° C. for 6 hours. After the reaction ended, re-precipitation was performed from 150 ml of ethanol to collect the product. The obtained polymer was washed with 1N hydrochloric acid for one day and further washed by agitating in water for one day, and 0.37 g of polymer was obtained by carrying out drying under reduced pressure.

The structure of the obtained polymer was determined by analyzing with $^1$H-NMR (FT-NMR: Bruker DPX400; resonant frequency: 400 MHz; nuclide measured: $^1$H; solvent used: d-DMSO; measurement temperature: room temperature) and Fourier transformation-infrared absorption (FT-IR) spectrum (Nicolet AVATAR360 FT-IR). As a result of performing IR measurement, the peak of 1,695 cm$^{-1}$ resulted from carboxylic acid decreased, and a peak resulted from amide group at 1,658 cm$^{-1}$ was newly observed.

The results of $^1$H-NMR showed a shift of the peak resulted from the aromatic ring of 4-methoxyaniline-2-sulfonic acid structure and accordingly it was confirmed that the obtained polymer was a polyhydroxyalkanoate containing a unit represented by the following chemical formula (57) as a monomer unit.

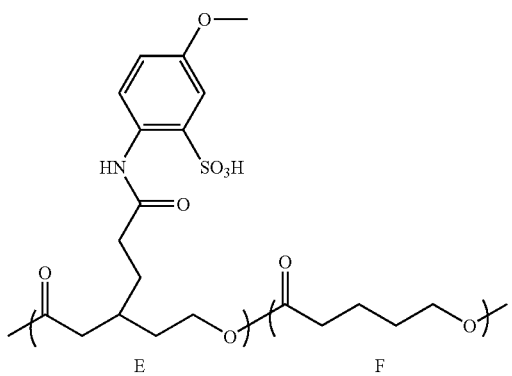

(57)

As for the ratio of the units in the polyhydroxyalkanoate represented by the chemical formula (57), it was confirmed that it was a copolymer having a monomer ratio of 13 mol % for unit E and 87 mol % for unit F.

The average molecular weight of the obtained polymer was estimated by gel permeation chromatography (GPC; TOSOH HLC-8120, column; Polymer Laboratories PLgel 5 μ MIXED-C, solvent; DMF/LiBr 0.1% (w/v), polystyrene conversion). Consequently, the number average molecular weight, Mn was 14,800, and weight average molecular weight, Mw was 20,600.

Example 24

Condensation reaction of the polyhydroxyalkanoate which consist of a unit represented by chemical formula (49) synthesized in Example 15 and taurine

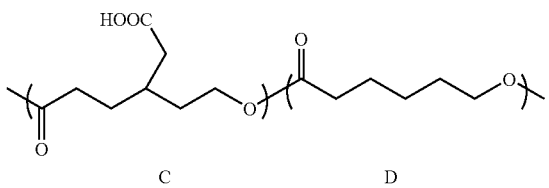

(49)

In a nitrogen atmosphere, 0.40 g of the polyhydroxyalkanoate copolymer which consists of a unit represented by the chemical formula (49) (C: 12 mol %, D: 88 mol %) obtained in Example 15, 0.25 g of taurine were added to a 100 ml three-necked flask and agitated with 15.0 ml of pyridine added, and then 1.03 ml of triphenyl phosphite was added and heated at 120° C. for 6 hours. After the reaction ended, re-precipitation was performed from 150 ml of ethanol to collect the product. The obtained polymer was washed with 1N hydrochloric acid for one day and further washed by agitating in water for one day, and 0.31 g of polymer was obtained by carrying out drying under reduced pressure.

The structure of the obtained polymer was determined by analyzing with $^1$H-NMR (FT-NMR: Bruker DPX400; resonant frequency: 400 MHz; nuclide measured: $^1$H; solvent used: d-DMSO; measurement temperature: room temperature) and Fourier transformation-infrared absorption (FT-IR) spectrum (Nicolet AVATAR360 FT-IR). As a result of performing IR measurement, the peak of 1,695 cm$^{-1}$ resulted from carboxylic acid decreased, and a peak resulted from amide group at 1,668 cm$^{-1}$ was newly observed.

The results of $^1$H-NMR showed a shift of the peak resulted from the methylene of taurine structure and accordingly it was confirmed that the obtained polymer was a polyhydroxyalkanoate containing a unit represented by the following chemical formula (58) as a monomer unit.

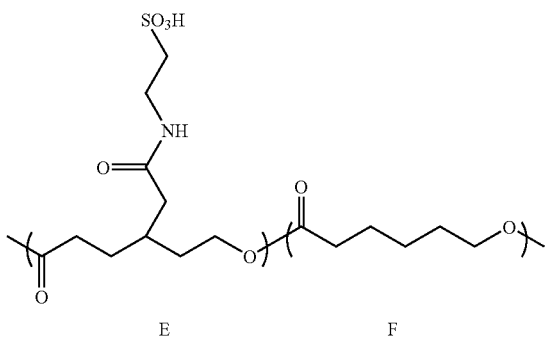

(58)

As for the ratio of the units in the polyhydroxyalkanoate represented by the chemical formula (58), it was confirmed that it was a copolymer having a monomer ratio of 12 mol % for unit E and 88 mol % for unit F.

The average molecular weight of the obtained polymer was estimated by gel permeation chromatography (GPC; TOSOH HLC-8120, column; Polymer Laboratories PLgel 5 μ MIXED-C, solvent; DMF/LiBr 0.1% (w/v), polystyrene conversion). Consequently, the number average molecular weight, Mn was 15,500, and weight average molecular weight, Mw was 22,200.

Example 25

Condensation reaction of polyhydroxyalkanoate which consist of a unit represented by chemical formula (37) synthesized in Example 7 and 2-aminobenzenesulfonic acid

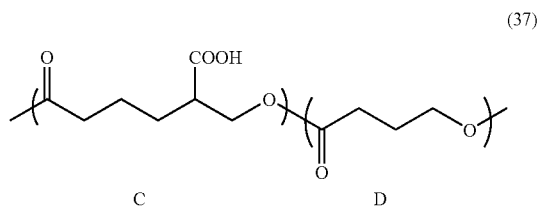

(37)

In a nitrogen atmosphere, 0.40 g of the polyhydroxyalkanoate copolymer which consists of a unit represented by the chemical formula (37) (C: 14 mol %, D: 86 mol %) obtained in Example 7, 0.40 g of 2-aminobenzenesulfonic acid were added to a 100 ml three-necked flask and agitated with 15.0 ml of pyridine added, and then 1.21 ml of triphenyl phosphite was added and heated at 120° C. for 6 hours. After the reaction ended, re-precipitation was performed from 150 ml of ethanol to collect the product. The obtained polymer was washed with 1N hydrochloric acid for one day and further washed by agitating in water for one day, and 0.36 g of polymer was obtained by carrying out drying under reduced pressure.

The structure of the obtained polymer was determined by analyzing with $^1$H-NMR (FT-NMR: Bruker DPX400; resonant frequency: 400 MHz; nuclide measured: $^1$H; solvent used: d-DMSO; measurement temperature: room temperature) and Fourier transformation-infrared absorption (FT-IR) spectrum (Nicolet AVATAR360 FT-IR). As a result of performing IR measurement, the peak of 1,695 cm$^{-1}$ resulted from carboxylic acid decreased, and a peak resulted from amide group at 1,658 cm$^{-1}$ was newly observed.

The results of $^1$H-NMR showed a shift of the peak resulted from the aromatic ring of 2-aminobenzenesulfonic acid structure and accordingly it was confirmed that the obtained polymer was a polyhydroxyalkanoate containing a unit represented by the following chemical formula (59) as a monomer unit.

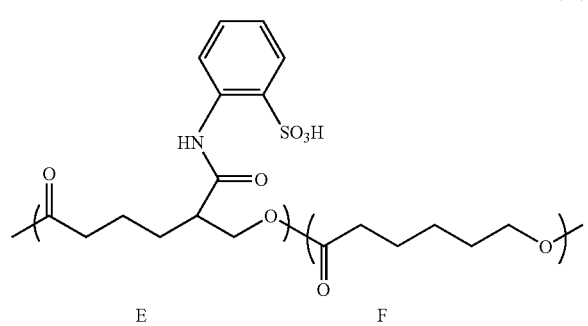

(59)

As for the ratio of the units in the polyhydroxyalkanoate represented by the chemical formula (59), it was confirmed that it was a copolymer having a monomer ratio of 14 mol % for unit E and 86 mol % for unit F.

The average molecular weight of the obtained polymer was estimated by gel permeation chromatography (GPC; TOSOH HLC-8120, column; Polymer Laboratories PLgel 5 μ MIXED-C, solvent; DMF/LiBr 0.1% (w/v), polystyrene conversion). Consequently, the number average molecular weight, Mn was 9,400, and weight average molecular weight, Mw was 13,400.

Example 26

Condensation reaction of the polyhydroxyalkanoate which consist of a unit represented by chemical formula (40) synthesized in Example 8 and 2-amino-2-methylpropanesulfonic acid

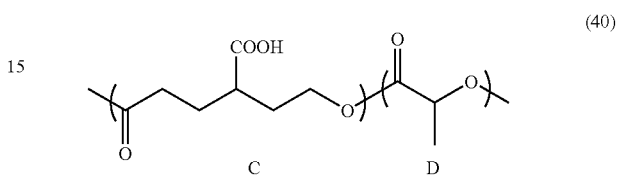

(40)

In a nitrogen atmosphere, 0.40 g of the polyhydroxyalkanoate copolymer which consists of a unit represented by the chemical formula (40) (C: 8 mol %, D: 92 mol %) obtained in Example 8, 0.31 g of 2-amino-2-methylpropanesulfonic acid were added to a 100 ml three-necked flask and agitated with 15.0 ml of pyridine added, and then 1.06 ml of triphenyl phosphite was added and heated at 120° C. for 6 hours. After the reaction ended, re-precipitation was performed from 150 ml of ethanol to collect the product. The obtained polymer was washed with 1N hydrochloric acid for one day and further washed by agitating in water for one day, and 0.33 g of polymer was obtained by carrying out drying under reduced pressure.

The structure of the obtained polymer was determined by analyzing with $^1$H-NMR (FT-NMR: Bruker DPX400; resonant frequency: 400 MHz; nuclide measured: $^1$H; solvent used: d-DMSO; measurement temperature: room temperature) and Fourier transformation-infrared absorption (FT-IR) spectrum (Nicolet AVATAR360 FT-IR). As a result of performing IR measurement, the peak of 1,695 cm$^{-1}$ resulted from carboxylic acid decreased, and a peak resulted from amide group at 1,668 cm$^{-1}$ was newly observed.

The results of $^1$H-NMR showed a shift of the peak resulted from the methylene of 2-amino-2-methylpropanesulfonic acid structure and accordingly it was confirmed that the obtained polymer was a polyhydroxyalkanoate containing a unit represented by the following chemical formula (60) as a monomer unit.

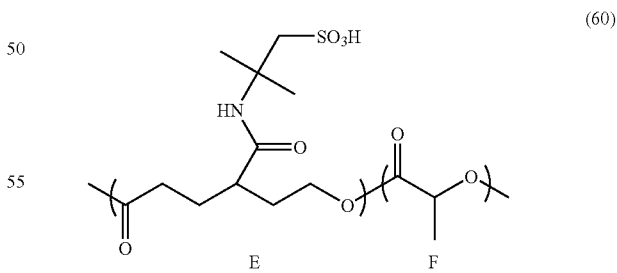

(60)

As for the ratio of the units in the polyhydroxyalkanoate represented by the chemical formula (60), it was confirmed that it was a copolymer having a monomer ratio of 8 mol % for unit E and 92 mol % for unit F.

The average molecular weight of the obtained polymer was estimated by gel permeation chromatography (GPC; TOSOH HLC-8120, column; Polymer Laboratories PLgel 5 μ MIXED-C, solvent; DMF/LiBr 0.1% (w/v), polystyrene con-

Example 27

Condensation reaction of polyhydroxyalkanoate which consist of a unit represented by chemical formula (40) synthesized in Example 8 and 4-aminobenzenesulfonic acid phenyl ester

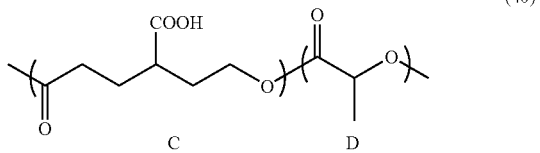
(40)

In a nitrogen atmosphere, 0.40 g of the polyhydroxyalkanoate copolymer which consists of a unit represented by the chemical formula (40) (C: 8 mol %, D: 92 mol %) obtained in Example 8, 0.51 g of 4-aminobenzenesulfonic acid phenyl ester were added to a 100 ml three-necked flask and agitated with 15.0 ml of pyridine added, and then 1.06 ml of triphenyl phosphite was added and heated at 120° C. for 6 hours. After the reaction ended, re-precipitation was performed from 150 ml of ethanol to collect the product. The obtained polymer was washed with 1N hydrochloric acid for one day and further washed by agitating in water for one day, and 0.35 g of polymer was obtained by carrying out drying under reduced pressure.

The structure of the obtained polymer was determined by analyzing with $^1$H-NMR (FT-NMR: Bruker DPX400; resonant frequency: 400 MHz; nuclide measured: $^1$H; solvent used: d-DMSO; measurement temperature: room temperature) and Fourier transformation-infrared absorption (FT-IR) spectrum (Nicolet AVATAR360 FT-IR). As a result of performing IR measurement, the peak of 1,695 cm$^{-1}$ resulted from carboxylic acid decreased, and a peak resulted from amide group at 1,658 cm$^{-1}$ was newly observed.

The results of $^1$H-NMR showed a shift of the peak resulted from the aromatic ring of 4-aminobenzenesulfonic acid phenyl ester structure and accordingly it was confirmed that the obtained polymer was a polyhydroxyalkanoate containing a unit represented by the following chemical formula (61) as a monomer unit.

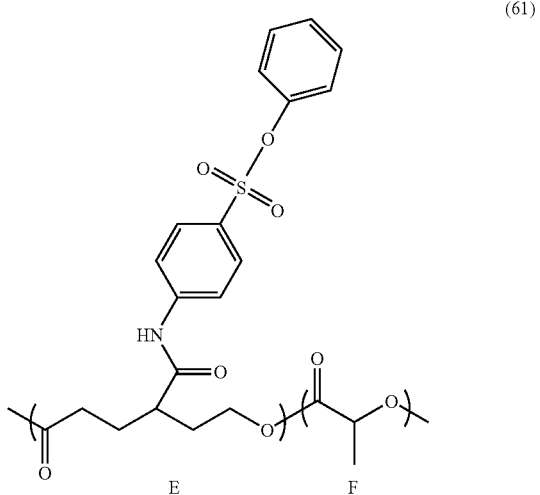
(61)

As for the ratio of the units in the polyhydroxyalkanoate represented by the chemical formula (61), it was confirmed that it was a copolymer having a monomer ratio of 8 mol % for unit E and 92 mol % for unit F.

The average molecular weight of the obtained polyhydroxyalkanoate was estimated by gel permeation chromatography (GPC; TOSOH HLC-8120, column; Polymer Laboratories PLgel 5 µ MIXED-C, solvent; DMF/LiBr 0.1% (w/v), polystyrene conversion). Consequently, the number average molecular weight, Mn was 7,800, and weight average molecular weight, Mw was 14,300.

Example 28

Condensation reaction of the polyhydroxyalkanoate which consist of a unit represented by chemical formula (40) synthesized in Example 8 and 1-naphthylamine-8-sulfonic acid

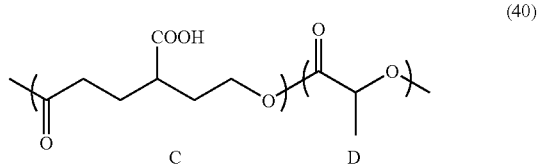
(40)

In a nitrogen atmosphere, 0.40 g of the polyhydroxyalkanoate copolymer which consists of a unit represented by the chemical formula (40) (C: 8 mol %, D: 92 mol %) obtained in Example 8, 0.45 g of 1-naphthylamine-8-sulfonic acid were added to a 100 ml three-necked flask and agitated with 15.0 ml of pyridine added, and then 1.06 ml of triphenyl phosphite was added and heated at 120° C. for 6 hours. After the reaction ended, re-precipitation was performed from 150 ml of ethanol to collect the product. The obtained polymer was washed with 1N hydrochloric acid for one day and further washed by agitating in water for one day, and 0.33 g of polymer was obtained by carrying out drying under reduced pressure.

The structure of the obtained polymer was determined by analyzing with $^1$H-NMR (FT-NMR: Bruker DPX400; resonant frequency: 400 MHz; nuclide measured: $^1$H; solvent used: d-DMSO; measurement temperature: room temperature) and Fourier transformation-infrared absorption (FT-IR) spectrum (Nicolet AVATAR360 FT-IR). As a result of performing IR measurement, the peak of 1,695 cm$^{-1}$ resulted from carboxylic acid decreased, and a peak resulted from amide group at 1,658 cm$^{-1}$ was newly observed.

The results of $^1$H-NMR showed a shift of the peak resulted from the aromatic ring of 1-naphthylamine-8-sulfonic acid structure and accordingly it was confirmed that the obtained polymer was a polyhydroxyalkanoate containing a unit represented by the following chemical formula (62) as a monomer unit.

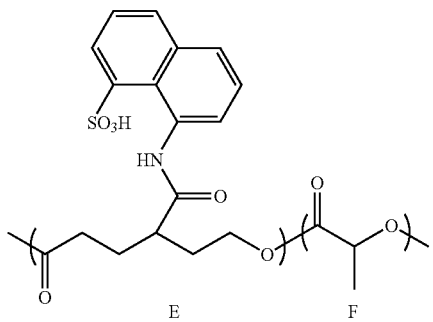

(62)

As for the ratio of the units in the polyhydroxyalkanoate represented by the chemical formula (62), it was confirmed that it was a copolymer having a monomer ratio of 8 mol % for unit E and 92 mol % for unit F.

The average molecular weight of the obtained polymer was estimated by gel permeation chromatography (GPC; TOSOH HLC-8120, column; Polymer Laboratories PLgel 5 μ MIXED-C, solvent; DMF/LiBr 0.1% (w/v), polystyrene conversion). Consequently, the number average molecular weight, Mn was 8,200, and weight average molecular weight, Mw was 12,400.

Example 29

Condensation reaction of the polyhydroxyalkanoate which consist of a unit represented by chemical formula (43) synthesized in Example 9 and 4-methoxyaniline-2-sulfonic acid

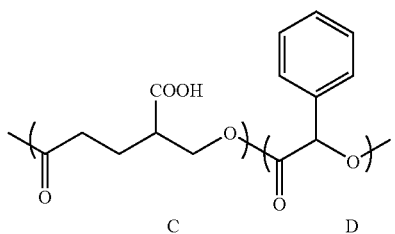

(43)

In a nitrogen atmosphere, 0.40 g of the polyhydroxyalkanoate copolymer which consists of a unit represented by the chemical formula (43) (C: 7 mol %, D: 93 mol %) obtained in Example 9, 0.21 g of 4-methoxyaniline-2-sulfonic acid were added to a 100 ml three-necked flask and agitated with 15.0 ml of pyridine added, and then 0.54 ml of triphenyl phosphite was added and heated at 120° C. for 6 hours. After the reaction ended, re-precipitation was performed from 150 ml of ethanol to collect the product. The obtained polymer was washed with 1N hydrochloric acid for one day and further washed by agitating in water for one day, and 0.32 g of polymer was obtained by carrying out drying under reduced pressure.

The structure of the obtained polymer was determined by analyzing with $^1$H-NMR (FT-NMR: Bruker DPX400; resonant frequency: 400 MHz; nuclide measured: $^1$H; solvent used: d-DMSO; measurement temperature: room temperature) and Fourier transformation-infrared absorption (FT-IR) spectrum (Nicolet AVATAR360 FT-IR). As a result of performing IR measurement, the peak of 1,695 cm$^{-1}$ resulted from carboxylic acid decreased, and a peak resulted from amide group at 1,658 cm$^{-1}$ was newly observed.

The results of $^1$H-NMR showed a shift of the peak resulted from the aromatic ring of 4-methoxyaniline-2-sulfonic acid structure and accordingly it was confirmed that the obtained polymer was a polyhydroxyalkanoate containing a unit represented by the following chemical formula (63) as a monomer unit.

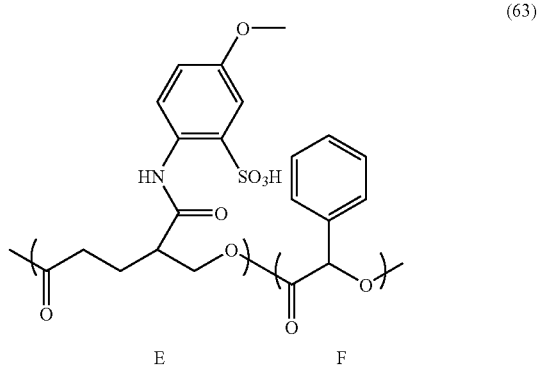

(63)

As for the ratio of the units in the polyhydroxyalkanoate represented by the chemical formula (63), it was confirmed that it was a copolymer having a monomer ratio of 7 mol % for unit E and 93 mol % for unit F.

The average molecular weight of the obtained polymer was estimated by gel permeation chromatography (GPC; TOSOH HLC-8120, column; Polymer Laboratories PLgel 5 μ MIXED-C, solvent; DMF/LiBr 0.1% (w/v), polystyrene conversion). Consequently, the number average molecular weight, Mn was 6,900, and weight average molecular weight, Mw was 10,100.

Example 30

Esterification reaction of the polyhydroxyalkanoate which consists of a unit represented by chemical formula (50) synthesized in Example 16

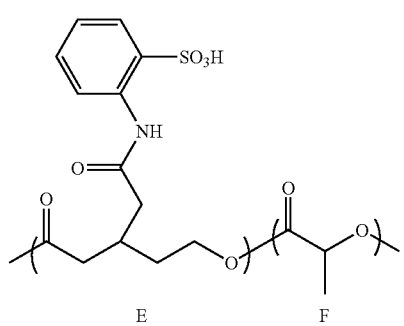

(50)

0.30 g of the polyhydroxyalkanoate copolymer which consists of a unit represented by the chemical formula (50) (E: 8 mol %, F: 92 mol %) obtained in Example 16 was added to an eggplant flask and dissolved with 21.0 ml of chloroform and 7.0 ml of methanol added and cooled to 0° C. 1.31 ml of 2 mol/L trimethylsilyldiazomethane-hexane solution (product of Aldrich) was added to this, and agitated for 4 hours. After the reaction ended, the solvent was removed with an evaporator and the polymer was collected.

21.0 ml of chloroform, 7.0 ml of methanol were further added to re-dissolve the polymer and the solvent was evaporated by an evaporator. This operation was repeated 3 times.

0.30 g of the polymer was obtained by drying the polymer collected here under reduced pressure.

The determination of the structure of the obtained polymer was performed by $^1$H-NMR (FT-NMR: Bruker DPX400; resonant frequency: 400 MHz; nuclide measured: $^1$H; solvent used: d-DMSO; measurement temperature: room temperature). The results of $^1$H-NMR showed a peak resulted from methyl sulfonate at 3 to 4 ppm and accordingly it was confirmed that the obtained polymer was a polyhydroxyalkanoate containing a unit represented by the following chemical formula (64) as a monomer unit.

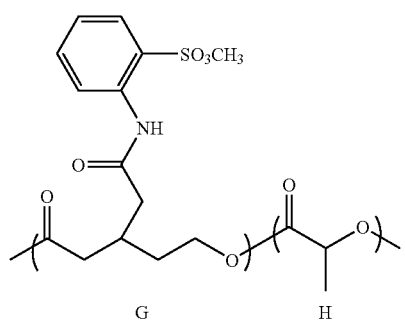

(64)

As for the ratio of the units in the polyhydroxyalkanoate represented by the chemical formula (64), it was confirmed that it was a copolymer having a monomer ratio of 8 mol % for unit G and 92 mol % for unit H.

In addition, there was no peak observed resulted from sulfonic acid in acid value titration using Potentiometric Titrator AT510 (product of Kyoto Electronics Manufacturing Co., Ltd.) and it was also made evident from this that sulfonic acid was converted to methyl sulfonate.

The average molecular weight of the obtained polymer was estimated by gel permeation chromatography (GPC; TOSOH HLC-8120, column; Polymer Laboratories PLgel 5 μ MIXED-C, solvent; DMF/LiBr 0.1% (w/v), polystyrene conversion). Consequently, the number average molecular weight, Mn was 15,900, and weight average molecular weight, Mw was 24,200.

Example 31

Esterification reaction of the polyhydroxyalkanoate which consists of a unit represented by chemical formula (58) synthesized in Example 24

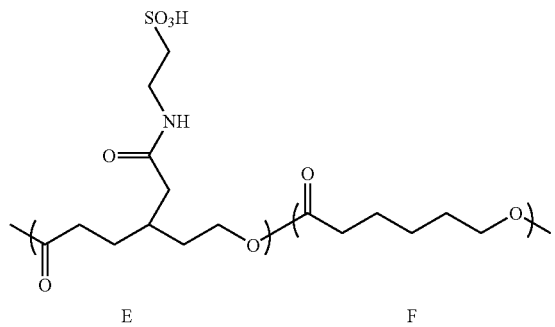

(58)

0.30 g of the polyhydroxyalkanoate copolymer which consists of a unit represented by the chemical formula (58) (E: 12 mol %, F: 88 mol %) obtained in Example 24 was added to an eggplant flask and dissolved with 21.0 ml of chloroform and 7.0 ml of methanol added and cooled to 0° C. 1.34 ml of 2 mol/L trimethylsilyldiazomethane-hexane solution (product of Aldrich) was added to this, and agitated for 4 hours. After the reaction ended, the solvent was removed with an evaporator and the polymer was collected.

21.0 ml of chloroform, 7.0 ml of methanol were further added to re-dissolve the polymer and the solvent was removed by an evaporator. This operation was repeated 3 times.

0.31 g of the polymer was obtained by drying the polymer collected here under reduced pressure.

The determination of the structure of the obtained polymer was performed by $^1$H-NMR (FT-NMR: Bruker DPX400; resonant frequency: 400 MHz; nuclide measured: $^1$H; solvent used: d-DMSO; measurement temperature: room temperature). The results of $^1$H-NMR showed a peak resulted from methyl sulfonate at 3 to 4 ppm and accordingly it was confirmed that the obtained polymer was a polyhydroxyalkanoate containing a unit represented by the following chemical formula (65) as a monomer unit.

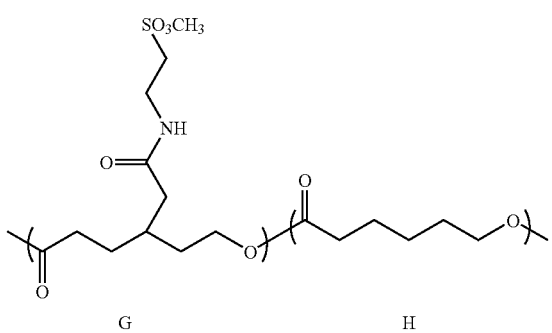

(65)

As for the ratio of the units in the polyhydroxyalkanoate represented by the chemical formula (65), it was confirmed that it was a copolymer having a monomer ratio of 12 mol % for unit G and 88 mol % for unit H.

In addition, there was no peak observed resulted from sulfonic acid in acid value titration using Potentiometric Titrator AT510 (product of Kyoto Electronics Manufacturing Co., Ltd.) and it was also made evident from this that sulfonic acid was converted to methyl sulfonate.

The average molecular weight of the obtained polymer was estimated by gel permeation chromatography (GPC; TOSOH HLC-8120, column; Polymer Laboratories PLgel 5 μ MIXED-C, solvent; DMF/LiBr 0.1% (w/v), polystyrene conversion). Consequently, the number average molecular weight, Mn was 14,700, and weight average molecular weight, Mw was 21,800.

Example 32

Esterification reaction of the polyhydroxyalkanoate which consists of a unit represented by chemical formula (62) synthesized in Example 28

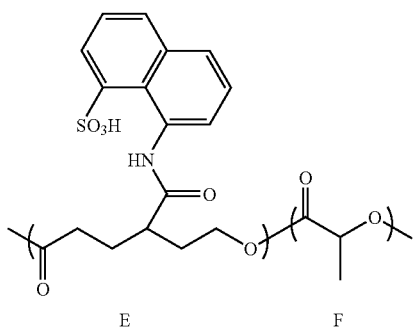

(62)

0.30 g of the polyhydroxyalkanoate copolymer which consists of a unit represented by the chemical formula (62) (E: 8 mol %, F: 92 mol %) obtained in Example 28 was added to an eggplant flask and dissolved with 21.0 ml of chloroform and 7.0 ml of methanol added and cooled to 0° C. 1.34 ml of 2 mol/L trimethylsilyldiazomethane-hexane solution (product of Aldrich) was added to this, and agitated for 4 hours. After the reaction ended, the solvent was removed with an evaporator and the polymer was collected.

21.0 ml of chloroform, 7.0 ml of methanol were further added to re-dissolve the polymer and the solvent was removed by an evaporator. This operation was repeated 3 times.

0.30 g of the polymer was obtained by drying the polymer collected here under reduced pressure.

The determination of the structure of the obtained polymer was performed by $^1$H-NMR (FT-NMR: Bruker DPX400; resonant frequency: 400 MHz; nuclide measured: $^1$H; solvent used: d-DMSO; measurement temperature: room temperature). The results of $^1$H-NMR showed a peak resulted from methyl sulfonate at 3 to 4 ppm and accordingly it was confirmed that the obtained polymer was a polyhydroxyalkanoate containing a unit represented by the following chemical formula (66) as a monomer unit.

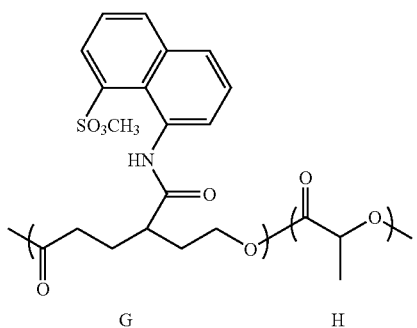

(66)

As for the ratio of the units in the polyhydroxyalkanoate represented by the chemical formula (66), it was confirmed that it was a copolymer having a monomer ratio of 8 mol % for unit G and 92 mol % for unit H.

In addition, there was no peak observed resulted from sulfonic acid in acid value titration using Potentiometric Titrator AT510 (product of Kyoto Electronics Manufacturing Co., Ltd.) and it was also made evident from this that sulfonic acid was converted to methyl sulfonate.

The average molecular weight of the obtained polymer was estimated by gel permeation chromatography (GPC; TOSOH HLC-8120, column; Polymer Laboratories PLgel 5 μ MIXED-C, solvent; DMF/LiBr 0.1% (w/v), polystyrene conversion). Consequently, the number average molecular weight, Mn was 7,500, and weight average molecular weight, Mw was 11,400.

Example 33

Synthesis of Polyester Using 5-ethenyl-2-oxepanone Represented by Chemical Formula (67) and ε-Caprolactone

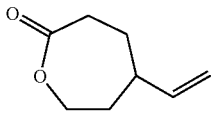

(67)

0.31 g (2.0 mmol) of 5-ethenyl-2-oxepanone represented by the chemical formula (67), 1.14 g (10.0 mmol) of ε-caprolactone, 4.8 ml of 0.01 M toluene solution of tin octylate (tin 2-ethylhexanoate), 4.8 ml of 0.01 M toluene solution of p-tert-butylbenzyl alcohol were placed in a polymerization ampoule and after performing drying under reduced pressure for 1 hour and nitrogen purge, it was heat-sealed under reduced pressure, and heated at 150° C. to perform ring-opening polymerization. The reaction was ended after 12 hours and the reaction product was cooled. The obtained polymer was dissolved in chloroform and re-precipitated in methanol in an amount of 10 times of the chloroform required for dissolving the polymer. The precipitation was collected and 0.86 g of polymer was obtained by carrying out drying under reduced pressure.

In order to identify the structure of the obtained polymer, NMR analysis was performed on the same conditions as in Example 1 and consequently it was confirmed that the obtained compound was a polyhydroxyalkanoate copolymer which contains a unit represented by the following chemical formula (68) as a monomer unit. It was also confirmed that the ratios of monomer units were 12 mol % for A unit and 88 mol % for B unit.

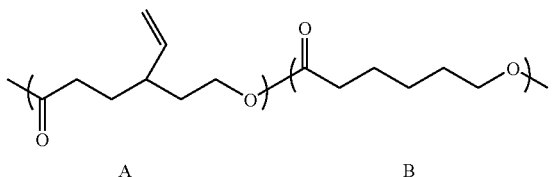

(68)

The average molecular weight of the obtained polyhydroxyalkanoate was estimated by gel permeation chromatography (GPC; TOSOH HLC-8220, column; TOSOH TSK-GEL Super HM-H, solvent; chloroform, polystyrene conversion). Consequently, the number average molecular weight, Mn was 17,500, and weight average molecular weight, Mw was 25,400.

Example 34

Oxidation reaction of polyhydroxyalkanoate which consists of a unit represented by chemical formula (68) synthesized in Example 33

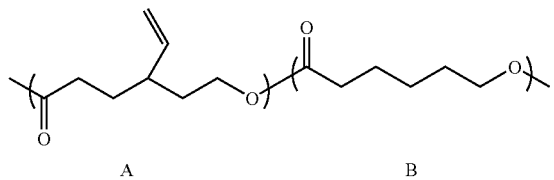

(68)

0.50 g of a polyhydroxyalkanoate copolymer which consists of a unit represented by the chemical formula (68) (A: 12 mol %, B: 88 mol %) obtained in Example 33 was added to an eggplant flask and dissolved with 30 ml of acetone added. This was placed in an ice bath, and 5 ml of acetic acid and 0.40 g of 18-crown-6-ether were added and the mixture was agitated. Next, 0.32 g of potassium permanganate was slowly added on the ice bath, and agitated in an ice bath for 2 hours, and agitated at room temperature for further 18 hours. 60 ml of ethyl acetate was added after the reaction ended, and 45 ml of water was further added. Next, sodium hydrogen sulfite was added until peracid was removed. Then, the pH of the liquid was adjusted to 1 with 1.0 N hydrochloric acid. The organic layer was extracted and washed 3 times with 1.0 N hydrochloric acid. After the organic layer was collected, crude polymer was collected by evaporating the solvent. Next, polymer was collected, after washed with 50 ml of water, 50 ml of methanol and further with 50 ml of water 3 times. Next, it was dissolved in 3 ml of THF, re-precipitation was performed using methanol in an amount of 50 times of THF required for dissolving the polymer. The precipitation was collected and 0.42 g of polymer was obtained by carrying out drying under reduced pressure.

In order to identify the structure of the obtained polymer, NMR analysis was performed on the same conditions as in Example 1 and consequently it was confirmed that the obtained compound was a polyhydroxyalkanoate which contains a unit represented by the following chemical formula (69) as a monomer unit.

(69)

The average molecular weight of the obtained polyhydroxyalkanoate was estimated by gel permeation chromatography (GPC; TOSOH HLC-8220, column; TOSOH TSK-GEL Super HM-H, solvent; chloroform, polystyrene conversion). Consequently, the number average molecular weight, Mn was 14,300, and weight average molecular weight, Mw was 21,500.

In order to calculate the unit of the obtained polyhydroxyalkanoate furthermore, carboxyl groups at the end of the side chains of the polyhydroxyalkanoate were subjected to methyl esterification using trimethylsilyldiazomethane and the calculation was performed.

30 mg of the target polyhydroxyalkanoate was added to 100 ml-volume eggplant flask and dissolved with 2.1 ml of chloroform and 0.7 ml of methanol added. 0.5 ml of 2 mol/L trimethylsilyldiazomethanehexane solution was added to this, and agitated at room temperature for 1 hour. After the reaction ended, the solvent was removed and the polymer was collected. It was washed with 50 ml of methanol and the polymer was collected after that. 29 mg of polyhydroxyalkanoate was obtained by carrying out drying under reduced pressure.

NMR analysis was performed on the same conditions as in Example 1 and consequently it was confirmed that the obtained polyhydroxyalkanoate represented by the chemical formula (69) was a copolymer having a monomer ratio of 11 mol % for C unit and 89 mol % for D unit.

Example 35

Synthesis of Polyester Using Tetrahydro-4-(2-propenyl)-2H-pyran-2-one and phenyllactide (3,6-Bis(phenylmethyl)-1,4-dioxane-2, 5-dione)

0.28 g (2.0 mmol) of tetrahydro-4-(2-propenyl)-2H-pyran-2-one represented by the chemical formula (26), 2.96 g (10.0 mmol) of phenyllactide, 4.8 ml of 0.01 M toluene solution of tin octylate (tin 2-ethylhexanoate), 4.8 ml of 0.01 M toluene solution of p-tert-butylbenzyl alcohol were placed in a polymerization ampoule and after performing drying under reduced pressure for 1 hour and nitrogen purge, it was heat-sealed under reduced pressure, and heated at 180° C. to perform ring-opening polymerization. The reaction was ended after 12 hours and the reaction product was cooled. The obtained polymer was dissolved in chloroform and re-precipitated in methanol in an amount of 10 times of the chloroform required for dissolving the polymer. The precipitation was collected and 2.07 g of polymer was obtained by carrying out drying under reduced pressure. In order to identify the structure of the obtained polymer, NMR analysis was performed on the same conditions as in Example 1 and consequently it was confirmed that the obtained compound was a polyhydroxyalkanoate copolymer which contains a unit represented by the following chemical formula (70) as a monomer unit. It was also confirmed that the ratios of monomer units were 11 mol % for A unit and 89 mol % for B unit.

(70)

The average molecular weight of the obtained polyhydroxyalkanoate was estimated by gel permeation chromatography (GPC; TOSOH HLC-8220, column; TOSOH TSK-GEL Super HM-H, solvent; chloroform, polystyrene conversion). Consequently, the number average molecular weight, Mn was 20,5500, and weight average molecular weight, Mw was 26,600.

Example 36

Oxidation reaction of polyhydroxyalkanoate which consists of a unit represented by chemical formula (70) synthesized in Example 35

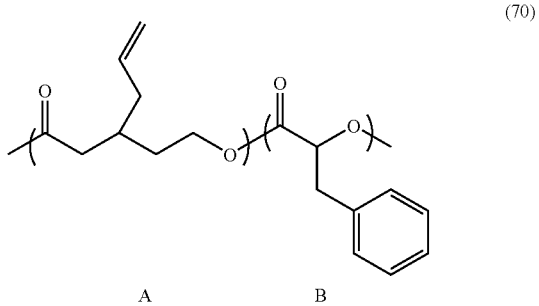

(70)

A    B 0.50 g of a polyhydroxyalkanoate copolymer which consists of a unit represented by the chemical formula (70) (A: 11 mol %, B: 89 mol %) obtained in Example 35 was added to an eggplant flask and dissolved with 30 ml of acetone added. This was placed in an ice bath, and 5 ml of acetic acid and 0.42 g of 18-crown-6-ether were added and the mixture was agitated. Next, 0.30 g of potassium permanganate was slowly added on the ice bath, and agitated in an ice bath for 2 hours, and agitated at room temperature for further 18 hours. 60 ml of ethyl acetate was added after the reaction ended, and 45 ml of water was further added. Next, sodium hydrogen sulfite was added until peracid was removed. Then, the pH of the liquid was adjusted to 1 with 1.0 N hydrochloric acid. The organic layer was extracted and washed 3 times with 1.0 N hydrochloric acid. After the organic layer was collected, crude polymer was collected by evaporating the solvent. Next, polymer was collected, after washed with 50 ml of water, 50 ml of methanol and further with 50 ml of water 3 times. Next, it was dissolved in 3 ml of THF, re-precipitation was performed using methanol in an amount of 50 times of THF required for dissolving the polymer. The precipitation was collected and 0.42 g of polymer was obtained by carrying out drying under reduced pressure.

In order to identify the structure of the obtained polymer, NMR analysis was performed on the same conditions as in Example 1 and consequently it was confirmed that the obtained compound was a polyhydroxyalkanoate which contains a unit represented by the following chemical formula (71) as a monomer unit.

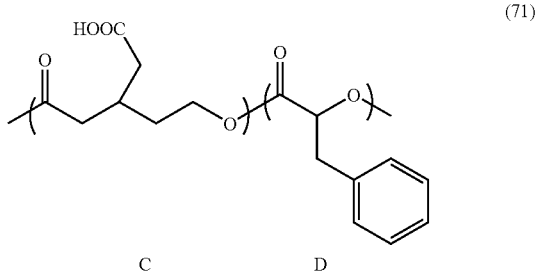

(71)

C    D

The average molecular weight of the obtained polyhydroxyalkanoate was estimated by gel permeation chromatography (GPC; TOSOH HLC-8220, column; TOSOH TSK-GEL Super HM-H, solvent; chloroform, polystyrene conversion). Consequently, the number average molecular weight, Mn was 16,800, and weight average molecular weight, Mw was 22,300.

In order to calculate the unit of the obtained polyhydroxyalkanoate furthermore, carboxyl groups at the end of the side chains of the polyhydroxyalkanoate were subjected to methyl esterification using trimethylsilyldiazomethane and the calculation was performed.

30 mg of the target polyhydroxyalkanoate was added to 100 ml-volume eggplant flask and dissolved with 2.1 ml of chloroform and 0.7 ml of methanol added. 0.5 ml of 2 mol/L trimethylsilyldiazomethanehexane solution was added to this, and agitated at room temperature for 1 hour. After the reaction ended, the solvent was removed and the polymer was collected. It was washed with 50 ml of methanol and the polymer was collected after that. 29 mg of polyhydroxyalkanoate was obtained by carrying out drying under reduced pressure.

NMR analysis was performed on the same conditions as in Example 1 and consequently it was confirmed that the obtained polyhydroxyalkanoate represented by the chemical formula (71) was a copolymer having a monomer ratio of 11 mol % for C unit and 89 mol % for D unit.

Example 37

Condensation reaction of polyhydroxyalkanoate which consist of a unit represented by chemical formula (71) synthesized in Example 36 and 2-aminobenzenesulfonic acid

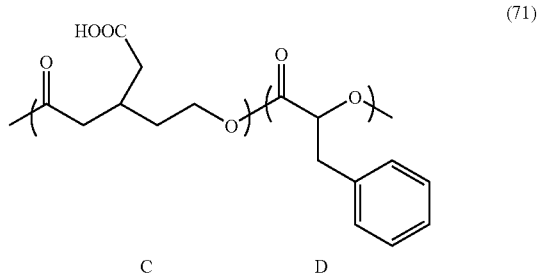

(71)

C    D

In a nitrogen atmosphere, 0.40 g of the polyhydroxyalkanoate copolymer which consists of a unit represented by the chemical formula (71) (C: 11 mol %, D: 89 mol %) obtained in Example 36, 0.26 g of 2-aminobenzenesulfonic acid were added to a 100 ml three-necked flask and agitated with 15.0 ml of pyridine added, and then 0.77 ml of triphenyl phosphite was added and heated at 120° C. for 6 hours. After the reaction ended, re-precipitation was performed from 150 ml of ethanol to collect the product. The obtained polymer was washed with 1N hydrochloric acid for one day and further washed by agitating in water for one day, and 0.34 g of polymer was obtained by carrying out drying under reduced pressure.

The structure of the obtained polymer was determined by analyzing with $^1$H-NMR (FT-NMR: Bruker DPX400; resonant frequency: 400 MHz; nuclide measured: $^1$H;. solvent used: d-DMSO; measurement temperature: room temperature) and Fourier transformation-infrared absorption (FT-IR) spectrum (Nicolet AVATAR360 FT-IR). As a result of performing IR measurement, the peak of 1,695 cm$^{-1}$ resulted from carboxylic acid decreased, and a peak resulted from amide group at 1,658 cm$^{-1}$ was newly observed.

The results of $^1$H-NMR showed a shift of the peak resulted from the aromatic ring of 2-aminobenzenesulfonic acid structure and accordingly it was confirmed that the obtained polymer was a polyhydroxyalkanoate containing a unit represented by the following chemical formula (72) as a monomer unit.

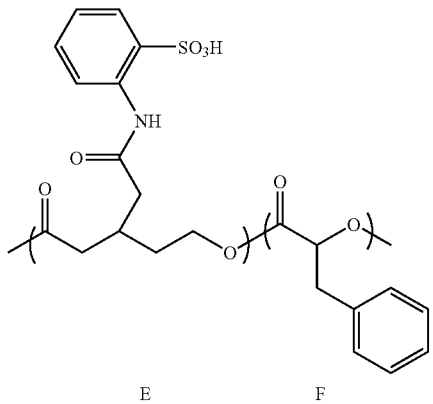

(72)

As for the ratio of the units in the polyhydroxyalkanoate represented by the chemical formula (72), it was confirmed that it was a copolymer having a monomer ratio of 11 mol % for unit E and 89 mol % for unit F.

The average molecular weight of the obtained polymer was estimated by gel permeation chromatography (GPC; TOSOH HLC-8120, column; Polymer Laboratories PLgel 5 μ MIXED-C, solvent; DMF/LiBr 0.1% (w/v), polystyrene conversion). Consequently, the number average molecular weight, Mn was 16,000, and weight average molecular weight, Mw was 22,700.

A novel polyhydroxyalkanoate which contains a vinyl group, which is a reactive group, on a side chain in a molecule, a novel polyhydroxyalkanoate which contains a carboxyl group in a molecule, a novel polyhydroxyalkanoate which contains a unit having an amide group and a sulfonic acid group in a molecule, and a production method thereof are provided by the present invention. These new polyhydroxyalkanoates having a vinyl group or a carboxyl group can have functional groups introduced therein utilizing these reactive groups, and accordingly can be applied to functional materials. Furthermore, polyhydroxyalkanoates which contain in a molecule a carboxyl group and a unit having an amide group and a sulfonic acid group are excellent in melt processability, and also excellent in biocompatibility due to their hydrophilicity, and can be expected to be applied to soft materials for medical use, etc.

This application claims priority from Japanese Patent Application No. 2004-174784 filed Jun. 11, 2004, which is hereby incorporated by reference herein.

The invention claimed is:

1. A polyhydroxyalkanoate comprising one or more units represented by chemical formula (1) in a molecule:

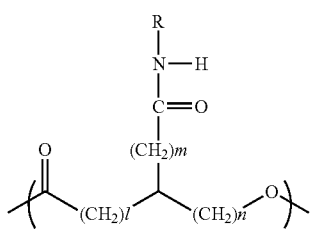

(1)

wherein R represents —$A_1$—$SO_2R_1$;

wherein $R_1$ is selected from the group consisting of OH, a halogen atom, ONa, OK and $OR_{1a}$;

wherein $R_{1a}$ and $A_1$ independently represent a group having a substituted or unsubstituted aliphatic hydrocarbon structure, a substituted or unsubstituted aromatic ring structure or a substituted or unsubstituted heterocyclic structure, respectively;

wherein l is an integer selected from 1 to 4, n is an integer selected from 1 to 4, and m is an integer selected from 0 to 8; and wherein when two or more units are present, R, $R_1$, $R_{1a}$, $A_1$, l, m and n are selected independently for each unit.

2. The polyhydroxyalkanoate according to claim 1 comprising one or more units selected from the group consisting of chemical formula (2), chemical formula (3), chemical formula (4A) and chemical formula (4B) in a molecule as a unit of the chemical formula (1)

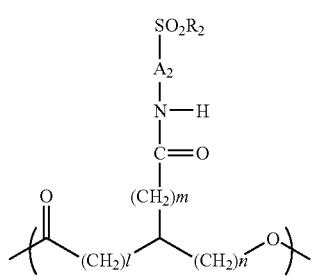

(2)

wherein $R_2$ is selected from the group consisting of OH, a halogen atom, ONa, OK and $OR_{2a}$;

wherein $R_{2a}$ is a linear or branched alkyl group having 1 to 8 carbon atoms or a substituted or unsubstituted phenyl group;

wherein $A_2$ represents a linear or branched alkylene group having 1 to 8 carbon atoms;

wherein l is an integer selected from 1 to 4, n is an integer selected from 1 to 4 and m is an integer selected from 0 to 8; and wherein when two or more units are present, $A_2$, $R_2$, $R_{2a}$, l, m and n are independently selected for each unit;

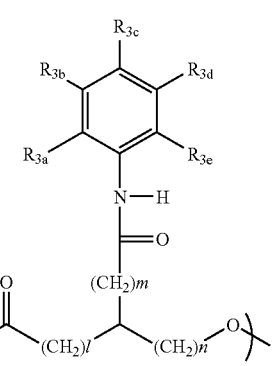

(3)

wherein $R_{3a}$, $R_{3b}$, $R_{3c}$, $R_{3d}$ and $R_{3e}$ area independently. $SO_2R_{3f}$, wherein $R_{3f}$ is selected from the group consisting of OH, a halogen atom, ONa, OK and $OR_{3f1}$, wherein $OR_{3f1}$ is a linear or branched alkyl group having 1 to 8 carbon atoms or a substituted or unsubstituted phenyl group; a hydrogen atoms; halogen atoms;an alkyl group having 1 to 20 carbon atoms; an alkoxy group having 1 to 20 carbon atoms;OH, $NH_2$; $NO_2$; $COOR_{3g}$, wherein $R_{3g}$ represents any of H ; Na and K ; an acetamide group; OPh; NHPh; $CF_3$; $C_2F_5$; or-$C_3F_7$, wherein Ph represents a phenyl group, respectively; and at least one of $R_{3a}$, $R_{3b}$, $R_{3c}$, $R_{3d}$ and $R_{3e}$ is $SO_2R_{3f}$;

wherein l is an integer selected from 1 to 4, n is an integer selected from 1 to 4, and m is an integer selected from 0 to 8; and wherein when two or more units are present, $R_{3a}$, $R_{3b}$, $R_{3c}$, $R_{3d}$, $R_{3e}$, $R_{3f}$, $R_{3f1}$, $R_{3g}$, and l, m and n are independently selected for each unit;

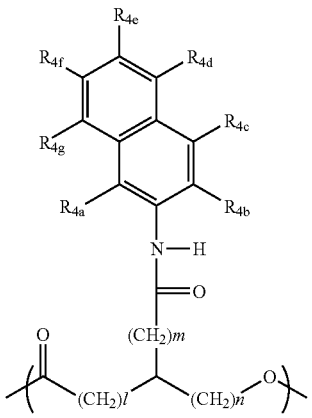

(4A)

wherein $R_{4a}$, $R_{4b}$, $R_{4c}$, $R_{4d}$, $R_{4e}$, $R_{4f}$ and $R_{4g}$ are, independently, $SO_2R_{4o}$, wherein $R_{4o1}$ is selected from the group consisting of OH, a halogen atom, ONa, OK and $OR_{4o1}$, wherein $OR_{4o1}$ is a linear or branched alkyl group having 1 to 8 carbon atoms or a substituted or unsubstituted phenyl group; a hydrogen atom; halogen atom; an alkyl group having 1 to 20 carbon atoms; an alkoxy group having 1 to 20 carbon atoms; OH; $NH_2$; $NO_2$; $COOR_{4p}$ wherein $R_{4p}$ represents any of H, Na and K; an acetamide group; Oph; NHPh; $CF_3$; $C_2F_5$ or $C_3F_7$, wherein Ph represents a phenyl group, respectively; and at least one of $R_{4a}$, $R_{4b}$, $R_{4c}$, $R_{4d}$, $R_{4e}$, $R_{4f}$ and $R_{4g}$ is $SO_2R_{4o}$;

wherein l is an integer selected from 1 to 4, n is an integer selected from 1 to 4, and m is an integer selected from 0 to 8; and wherein when two or more units are present, $R_{4a}$, $R_{4b}$, $R_{4c}$, $R_{4d}$, $R_{4e}$, $R_{4f}$, $R_{4g}$, $R_{4o}$, $R_{4o1}$, $R_{4p}$, and l, m and n are independently selected for each unit;

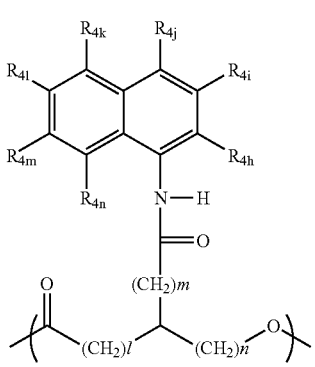

(4B)

wherein $R_{4h}$, $R_{4i}$, $R_{4j}$, $R_{4k}$, $R_{4l}$, $R_{4m}$ and $R_{4n}$ are independently, $SO_2R_{4o}$, wherein $R_{4o}$ is selected from the group consisting of OH, a halogen atom, ONa, OK and $OR_{4o1}$, wherein $OR_{4o1}$ is a linear or branched alkyl group having 1 to 8 carbon atoms or a substituted or unsubstituted phenyl group; a hydrogen atom; a halogen atom; an alkyl group having 1 to 20 carbon atoms; an alkoxy group having 1 to 20 carbon atoms; OH; $NH_2$; $NO_2$; $COOR_{4p}$, wherein $R_{4p}$ represents any of H, Na and K; an acetamide group; OPh; NHPh; $CF_3$; $C_2F_5$; or $C_3F_7$, wherein Ph represents a phenyl group, respectively, and at least one of $R_{4h}$, $R_{4i}$, $R_{4j}$, $R_{4k}$, $R_{4l}$, $R_{4m}$ and $R_{4n}$ is $SO_2R_{4o}$;

wherein l is an integer selected from 1 to 4, n is an integer selected from 1 to 4, and m is an integer selected from 0 to 8; and wherein when two or more units are present, $R_{4h}$, $R_{4i}$, $R_{4j}$, $R_{4k}$, $R_{4l}$, $R_{4m}$, $R_{4n}$, $R_{4o}$, $R_{4o1}$, $R_{4p}$, and l, m and n are independently selected for each unit.

3. The polyhydroxyalkanoate according to claim 1 or 2, further comprising one or more units represented by chemical formula (7) in a molecule:

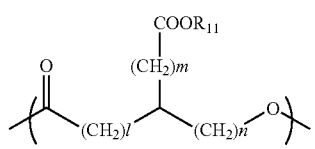

(7)

wherein $R_7$ is a linear or branched alkylene group having 1 to 11 carbon atoms, an alkyleneoxyalkylene group, wherein each alkylene group is independently an alkylene group having 1 to 2 carbon atoms, respective, or an alkylidene group having 1 to 5 carbon atoms, which may be substituted with aryl; and wherein when two or more units are present, $R_7$ is independently selected for each unit.

4. A method of producing a polyhydroxyalkanoate containing a unit represented by chemical formula (1) comprising a step of subjecting a polyhydroxyalkanoate containing a unit represented by chemical formula (11) and at least one amine compound represented by chemical formula (13) to a condensation reaction:

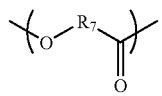

(11)

wherein $R_{11}$ is hydrogen or a salt forming group;

wherein l is an integer selected from 1 to 4, n is an integer selected from 1 to 4, and m is an integer selected from 0 to 8; and wherein when two or more units are present, l, m, n and $R_{11}$ are independently selected for each unit;

(13)

wherein $R_{13}$ is selected from the group consisting of OH, a halogen atom, ONa, OK and $OR_{13a}$;

wherein $R_{13a}$ and $A_3$ are independently selected from a group having a substituted or unsubstituted aliphatic hydrocarbon structure, a substituted or unsubstituted aromatic ring structure or a substituted or unsubstituted heterocyclic structure, respectively; and wherein when two or more units are present, $R_{13}$, $R_{13a}$ and $A_3$ are independently selected for each unit;

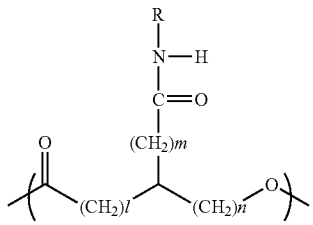
(1)

wherein R represents $-A_1-SO_2R_1$;

wherein $R_1$ is selected from the group consisting of OH, a halogen atom, ONa, OK and $OR_{1a}$;

wherein $R_{1a}$ and $A_1$ independently represent a group having a substituted or unsubstituted aliphatic hydrocarbon structure, a substituted or unsubstituted aromatic ring structure or a substituted or unsubstituted heterocyclic structure, respectively;

wherein l is an integer selected from 1 to 4, n is an integer selected from 1 to 4, and m is an integer selected from 0 to 8; and wherein when two or more units are present, R, $R_1$, $R_{1a}$, $A_1$, and l, m and n are independently selected for each unit.

* * * * *